(12) United States Patent
Bradley et al.

(10) Patent No.: US 10,762,280 B2
(45) Date of Patent: *Sep. 1, 2020

(54) SYSTEMS, DEVICES, AND METHODS FOR FACILITATING WEBSITE REMEDIATION AND PROMOTING ASSISTIVE TECHNOLOGIES

(71) Applicant: AudioEye, Inc., Tucson, AZ (US)

(72) Inventors: Sean D. Bradley, Tucson, AZ (US); Mark D. Baker, Marietta, GA (US); Jeffrey O. Jones, Roswell, GA (US); Kenny P. Hefner, Buchanan, GA (US); Adam Finkelstein, Alpharetta, GA (US); Douglas J. Gilormo, Cumming, GA (US); Taylor R. Bodnar, Tucson, AZ (US); David C. Pinckney, Roswell, GA (US); Charlie E. Blevins, Atlanta, GA (US); Helena Laymon, Duluth, GA (US); Trevor C. Jones, Kennesaw, GA (US); Damien M. Carrillo, Tucson, AZ (US)

(73) Assignee: AudioEye, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,568

(22) Filed: Aug. 6, 2019

(65) Prior Publication Data

US 2020/0073921 A1 Mar. 5, 2020

Related U.S. Application Data

(63) Continuation of application No. 15/999,116, filed on Aug. 16, 2018, now Pat. No. 10,423,709.

(51) Int. Cl.
*H04N 21/4725* (2011.01)
*H04N 21/4728* (2011.01)
(Continued)

(52) U.S. Cl.
CPC .............. *G06F 40/14* (2020.01); *G06F 16/22* (2019.01); *G06F 16/951* (2019.01);
(Continued)

(58) Field of Classification Search
CPC .. G06F 3/167; G06F 2221/0702; G06F 40/14; G06F 40/103; G06F 40/174;
(Continued)

(56) References Cited

U.S. PATENT DOCUMENTS 5,918,223 A 6/1999 Blum et al.
5,930,752 A 7/1999 Kawaguchi et al.
(Continued)

FOREIGN PATENT DOCUMENTS

WO WO 2006/065877 6/2006
WO WO 2013/184273 12/2013
WO WO 2017/161008 9/2017

OTHER PUBLICATIONS

US 8,874,716, Aug. 2000, (withdrawn).
(Continued)

*Primary Examiner* — Cesar B Paula
*Assistant Examiner* — Luu-Phuong T Nguyen
(74) *Attorney, Agent, or Firm* — Knobbe Martens Olson & Bear, LLP

(57) ABSTRACT

Systems and methods are disclosed for manually and programmatically remediating websites to thereby facilitate website navigation by people with diverse abilities. For example, an administrator portal is provided for simplified, form-based creation and deployment of remediation code, and a machine learning system is utilized to create and suggest remediations based on past remediation history. Voice command systems and portable document format (PDF) remediation techniques are also provided for improving the accessibility of such websites.

20 Claims, 21 Drawing Sheets

(51) Int. Cl.

| | |
|---|---|
| *H04N 21/472* | (2011.01) |
| *H04N 21/858* | (2011.01) |
| *H03M 7/30* | (2006.01) |
| *G06F 40/14* | (2020.01) |
| *G06F 16/22* | (2019.01) |
| *G06F 16/951* | (2019.01) |
| *G06F 16/958* | (2019.01) |
| *G06F 16/957* | (2019.01) |
| *G06F 40/103* | (2020.01) |
| *G06F 40/134* | (2020.01) |
| *G06F 40/174* | (2020.01) |
| *G06F 3/16* | (2006.01) |
| *G06F 40/137* | (2020.01) |
| *G10L 13/00* | (2006.01) |

(52) U.S. Cl.
CPC ........ *G06F 16/9577* (2019.01); *G06F 16/986* (2019.01); *G06F 40/103* (2020.01); *G06F 40/134* (2020.01); *G06F 40/174* (2020.01); *G06F 3/167* (2013.01); *G06F 40/137* (2020.01); *G06F 2221/0702* (2013.01); *G10L 13/00* (2013.01)

(58) Field of Classification Search
CPC ...... G06F 16/22; G06F 16/951; G06F 16/986; G06F 16/9577; G06F 40/134; G06F 40/137; G10L 13/043; H04N 21/4725; H04N 21/4728; H04N 21/472; H04N 21/858; H03M 7/30
USPC ........................................................ 715/205
See application file for complete search history.

(56) References Cited

U.S. PATENT DOCUMENTS

| | | | |
|---|---|---|---|
| 5,991,781 | A | 11/1999 | Nielsen |
| 6,092,039 | A | 7/2000 | Zingher |
| 6,240,448 | B1 | 5/2001 | Imielinski et al. |
| 6,606,374 | B1 | 8/2003 | Rokoff et al. |
| 6,665,642 | B2 | 12/2003 | Kanevsky et al. |
| 6,742,021 | B1 | 5/2004 | Halverson et al. |
| 6,751,544 | B2 | 6/2004 | Hashimoto et al. |
| 6,934,684 | B2 | 8/2005 | Alpdemir et al. |
| 6,940,953 | B1 | 9/2005 | Eberle et al. |
| 6,959,279 | B1 | 10/2005 | Jackson et al. |
| 7,028,306 | B2 | 4/2006 | Boloker et al. |
| 7,106,220 | B2 | 9/2006 | Gourgey et al. |
| 7,124,366 | B2 | 10/2006 | Foreman et al. |
| 7,174,293 | B2 | 2/2007 | Kenyon et al. |
| 7,181,692 | B2 | 2/2007 | Siegel |
| 7,194,411 | B2 | 3/2007 | Slotznick et al. |
| 7,194,752 | B1 | 3/2007 | Kenyon et al. |
| 7,219,136 | B1 | 5/2007 | Danner et al. |
| 7,246,058 | B2 | 7/2007 | Burnett |
| 7,284,255 | B1 | 10/2007 | Apel et al. |
| 7,653,544 | B2 | 1/2010 | Bradley et al. |
| 7,702,674 | B2 | 4/2010 | Hyder et al. |
| 7,810,087 | B2 | 10/2010 | O'Brien |
| 7,966,184 | B2 | 6/2011 | Bradley et al. |
| 8,046,229 | B2 | 10/2011 | Bradley et al. |
| 8,055,713 | B2 | 11/2011 | Simske et al. |
| 8,090,800 | B2 | 1/2012 | Yee |
| 8,103,956 | B2 | 1/2012 | Trujillo |
| 8,260,616 | B2 | 9/2012 | O'Conor et al. |
| 8,296,150 | B2 | 10/2012 | Bradley et al. |
| 8,589,169 | B2 | 11/2013 | Bradley et al. |
| 8,694,319 | B2 | 4/2014 | Bodin et al. |
| 8,903,978 | B2 | 12/2014 | Zerr et al. |
| 8,990,392 | B1 | 3/2015 | Stamos |
| 9,208,783 | B2 | 12/2015 | Ativanichayaphong et al. |
| 9,268,753 | B2 | 2/2016 | Hendry et al. |
| 9,356,574 | B2 | 5/2016 | Denninghoff |
| 9,384,183 | B2 | 7/2016 | Kasa et al. |
| 9,727,660 | B2 | 8/2017 | Barrell et al. |
| 9,736,524 | B2 | 8/2017 | Aravamudan et al. |
| 9,875,671 | B2 | 1/2018 | Gharpure et al. |
| 9,996,613 | B2 | 6/2018 | Jadhav et al. |
| 10,237,334 | B2 | 3/2019 | Alexander et al. |
| 10,423,709 | B1 | 9/2019 | Bradley et al. |
| 10,444,934 | B2 | 10/2019 | Bradley et al. |
| 2002/0003547 | A1 | 1/2002 | Wang |
| 2002/0007379 | A1 | 1/2002 | Wang |
| 2002/0010584 | A1 | 1/2002 | Schultz et al. |
| 2002/0010715 | A1 | 1/2002 | Chinn et al. |
| 2002/0023020 | A1 | 2/2002 | Kenyon et al. |
| 2002/0065658 | A1 | 5/2002 | Kanevsky et al. |
| 2002/0074396 | A1 | 6/2002 | Rathus et al. |
| 2002/0124020 | A1 | 9/2002 | Janakiraman et al. |
| 2002/0194388 | A1 | 12/2002 | Boloker et al. |
| 2002/0198705 | A1 | 12/2002 | Burnett |
| 2003/0033434 | A1 | 2/2003 | Kavacheri et al. |
| 2003/0098803 | A1 | 5/2003 | Gourgey et al. |
| 2003/0115546 | A1 | 6/2003 | Dubey et al. |
| 2003/0158737 | A1 | 8/2003 | Csicsatka |
| 2004/0002808 | A1 | 1/2004 | Hashimoto et al. |
| 2004/0006478 | A1 | 1/2004 | Alpdemir et al. |
| 2004/0056882 | A1 | 3/2004 | Foreman et al. |
| 2004/0128136 | A1 | 7/2004 | Irani |
| 2004/0158429 | A1 | 8/2004 | Bary |
| 2004/0218451 | A1 | 11/2004 | Said et al. |
| 2004/0254988 | A1 | 12/2004 | Rodriguez |
| 2005/0033577 | A1 | 2/2005 | Bradley et al. |
| 2005/0108338 | A1 | 5/2005 | Simske et al. |
| 2005/0160065 | A1 | 7/2005 | Seeman |
| 2005/0195077 | A1 | 9/2005 | McCulloch et al. |
| 2006/0212466 | A1 | 9/2006 | Hyder et al. |
| 2007/0100628 | A1 | 5/2007 | Bodin et al. |
| 2007/0208687 | A1 | 9/2007 | Bradley et al. |
| 2008/0133500 | A1 | 6/2008 | Edwards |
| 2008/0168049 | A1 | 7/2008 | Gao et al. |
| 2008/0208593 | A1 | 8/2008 | Ativanichayaphong et al. |
| 2008/0235564 | A1 | 9/2008 | Erol et al. |
| 2010/0070872 | A1 | 3/2010 | Trujillo |
| 2010/0095210 | A1 | 4/2010 | Bradley et al. |
| 2010/0114578 | A1 | 5/2010 | Yuen et al. |
| 2010/0166165 | A1 | 7/2010 | Langseth et al. |
| 2010/0251217 | A1 | 9/2010 | Miller |
| 2011/0154212 | A1 | 6/2011 | Gharpure et al. |
| 2011/0231192 | A1 | 9/2011 | O'Conor et al. |
| 2011/0295623 | A1 | 12/2011 | Behringer et al. |
| 2011/0307259 | A1 | 12/2011 | Bradley et al. |
| 2012/0116872 | A1 | 5/2012 | Hicken et al. |
| 2012/0176509 | A1 | 7/2012 | Aravamudan et al. |
| 2012/0216243 | A1 | 8/2012 | Gill |
| 2012/0239405 | A1 | 9/2012 | O'Conor et al. |
| 2012/0240045 | A1 | 9/2012 | Bradley et al. |
| 2012/0278714 | A1 | 11/2012 | Bradley et al. |
| 2012/0322384 | A1 | 12/2012 | Zerr et al. |
| 2013/0073949 | A1 | 3/2013 | Barrell |
| 2014/0047337 | A1 | 2/2014 | Bradley et al. |
| 2014/0164352 | A1 | 6/2014 | Denninghoff |
| 2014/0195653 | A1 | 7/2014 | Alexander et al. |
| 2014/0365860 | A1 | 12/2014 | Spielberg et al. |
| 2015/0113410 | A1 | 4/2015 | Bradley et al. |
| 2015/0156084 | A1 | 6/2015 | Kaminsky |
| 2016/0306784 | A1 | 10/2016 | Bradley |
| 2016/0337426 | A1 | 11/2016 | Shribman |
| 2017/0269816 | A1 | 9/2017 | Bradley et al. |
| 2018/0075488 | A1 | 3/2018 | Celik et al. |
| 2018/0165258 | A1 | 6/2018 | Scoda |
| 2018/0191764 | A1* | 7/2018 | Chawla ............... H04L 63/1433 |
| 2018/0267847 | A1 | 9/2018 | Smith |
| 2018/0293504 | A1 | 10/2018 | Meruva |
| 2018/0336356 | A1* | 11/2018 | Papaxenopoulos ....... G06F 8/65 |
| 2019/0075081 | A1 | 3/2019 | Adam |

OTHER PUBLICATIONS

European Search Report and Written Opinion of EP 17767449.6 dated Oct. 15, 2019 in 10 pages.

(56) References Cited

OTHER PUBLICATIONS

International Search Report and Written Opinion of PCT/US2019/046361 dated Dec. 5, 2019 in 17 pages.
Schiavone et al., "An extensible environment for guideline-based accessibility evaluation of dynamic Web applications", Univ Access Inf Soc., Jan. 2015, 22 pages.
Bigham et al., "WebInSight: Making Web Images Accessible", Proceedings of the 8th International ACM SIG ACCESS Conference on Computers and Accessibility, 2006, pp. 181-188.
Brunet, et al., "Accessibility requirements for systems design to accommodate users with vision impairments", IBM Systems Journal, 2005, 44(3): 445-466.
Iaccarino et al., "Personalizable Edge Services for Web Accessibility", Univ Access Inf Soc 6, 2007, pp. 285-306 https://doi.org/10.1007/s10209-007-0091-y.
Maeda et al., "Web accessibility technology at the IBM Tokyo Research Laboratory", IBM Journal of Research and Development, Nov. 2004, 48(5/6): 735-749 http://dialog.proquest.com/professional/docview/220685504?accountid=157282.
Sensus Internet Browser, printed from www/sensus.dk/sibl0uk.htm on Jul. 23, 2002.
International Search Report and Written Opinion of PCT/US17/22542 dated Jun. 20, 2017 in 10 pages.
International Preliminary Report on Patentability dated Jan. 25, 2019 for International Application No. PCT/US2017/022542 in 36 pages.

\* cited by examiner

1000

| Element Reference | Issue Detected | Occurrences | Pages | Example Page |
|---|---|---|---|---|
| Body > .class1 | Missing ALT text | 1000042 | 1201 | Site.com/page1.html |
| Body > .class2 | iFrame w/o title | 75021 | 107 | Site.com/page2.html |
| . . . | | | | |

FIGURE 10

SYSTEMS, DEVICES, AND METHODS FOR FACILITATING WEBSITE REMEDIATION AND PROMOTING ASSISTIVE TECHNOLOGIES

CROSS REFERENCE TO RELATED APPLICATIONS

The present application is a continuation application of U.S. patent application Ser. No. 15/999,116, filed on Aug. 16, 2018, and entitled SYSTEMS, DEVICES, AND METHODS FOR FACILITATING WEBSITE REMEDIATION AND PROMOTING ASSISTIVE TECHNOLOGIES, which is hereby incorporated by reference in its entirety for all purposes.

BACKGROUND

Field

The embodiments herein relate generally to systems, devices, and methods for selectively enabling cloud-based assistive technologies and, more particularly, to techniques for remediating websites and other graphical user interfaces to enhance the user experience for users having diverse abilities.

Description

Various forms of assistive technologies, such as screen reader applications, voice command devices, and the like, have proven useful to visually impaired, color impaired, low vision, dyslexic, illiterate, and learning-disabled individuals, particularly with respect to computer accessibility.

Screen readers, for example, are used to translate textual and graphical information displayed on a screen and re-present it to the user using synthesized speech, sound icons, and/or a refreshable Braille output device. Screen readers may be incorporated into the operating system as native applications or may be packaged as separate commercial products.

Presently known screen readers, voice command systems, and other assistive technologies are disadvantageous, however, because of their limited ability to remediate sites which do not comply with industry recognized best practices, such as the Web Content Accessibility Guidelines (WCAG) 2.0, Accessible Rich Internet Applications (WAI-ARIA), Authoring Tool Accessibility Guidelines (ATAG), Section 508 Standards & Technical Requirements, and other existing and forthcoming national and international standards and guidelines.

New systems, devices, and methods are thus needed which overcome the limitations of assistive technologies.

SUMMARY

Various embodiments herein relate to systems, devices, and methods for providing an administrator portal for simplified, form-based creation and deployment of remediation code. Some embodiments herein relate to systems, devices, and methods for a machine learning platform trained to create and propose remediations and/or associated code based on, for example, past remediation history. Some embodiments herein relate to systems, devices, and methods for determining a set of remediations applicable to multiple web pages by, for example, identifying a template applicable to those web pages (e.g., based on DOM structure, URL structure, and/or accessibility test results). Some embodiments herein relate to systems, devices, and methods for monitoring the frequency with which web pages on a website are accessed (e.g., via an embedded tracking code configured to cause an analytics event) and prioritizing the remediation of the web pages accordingly. Some embodiments herein relate to systems, devices, and methods for adjusting the frequency with which web pages are scanned for remediation issues based on, for example, an estimated rate at which the web pages undergo a change of content. Some embodiments herein relate to systems, devices, and methods for personal information storage that allows a user to store and recall data (e.g., form fill-out data, personal notes, and/or custom "overrides" and shortcuts) using voice-based interactions. Some embodiments herein relate to providing a voice command platform that allows a user to perform a series of interactions (e.g., across multiple web pages) by issuing a single voice command. Some embodiments herein relate to systems, devices, and methods of a voice command platform that allows a user to view a guided tutorial that includes a series of interactions by issuing a single voice command. Some embodiments herein relate to systems, devices, and methods for dynamically routing voice commands to one or more natural language processing (NLP) and automatic speech recognition (ASR) systems based on context. Some embodiments herein relate to systems, devices, and methods for providing numerical labels adjacent to interactive elements on a web page to aid in selecting those interactive elements via a voice command. Some embodiments herein relate to systems, devices, and methods for providing for forwarding voice command requests to a selected service provider based on pre-populated user preference data. Some embodiments herein relate to systems, devices, and methods for enhanced accessibility of PDF documents.

In some embodiments, described herein are systems, devices, or methods for programmatic creation and deployment of remediations to non-compliant web pages or user interfaces, the system comprising: one or more remediation code databases configured to store a plurality of remediation code blocks; an integrated JavaScript code base for creating client-side interactivity with one or more web sites or user interfaces comprising a hypertext markup language (HTML) document object model (DOM), wherein the DOM comprises one or more nodes, the one or more nodes organized into a DOM tree structure; one or more computer readable storage devices configured to store a plurality of computer executable instructions; and one or more hardware computer processors in communication with the one or more computer readable storage devices and configured to execute the plurality of computer executable instructions in order to cause the system to: receive, from a user device, a request to access a web page associated with the one or more web sites or user interfaces; dynamically crawl, using a configuration file, the one or more web sites or user interfaces to generate a list of uniform resource locators (URLs) to be included as part of a compliance assessment of the one or more web sites or user interfaces; evaluate each of the one or more web pages associated with the generated list of URLs to identify one or more compliance issues, wherein the evaluation comprises loading each of the one or more web pages in a headless browser, applying the integrated Javascript code base, and executing a series of compliance tests; access, from the one or more remediation code databases, one or more remediation code blocks, each remediation code block corresponding to an identified compliance issue; programmatically apply the one or more remediation code blocks to the corresponding identified one or more compliance issues; and transmit, to the user device, for display, on the user device, the requested web page to which the one or more remediation code blocks have been applied; wherein application of the one or more remediation code blocks manipulates the DOM, causing a correction or enhancement of the one or more web sites or user interfaces upon loading and rendering.

In some embodiments, described herein are systems, devices, or methods, wherein the crawl of the one or more web sites or user interfaces is based on one or more scanning parameters, wherein the scanning parameters are manually or automatically configurable, and wherein the scanning parameters comprise at least one of maximum crawl time, level of recursion, percentage of pages catalogued, configurable threshold, and page depth.

In some embodiments, described herein are systems, devices, or methods, wherein the configuration file comprises one or more configuration options, the configuration options comprising configuration of at least one of: a user agent, browser dimensions, starting page, inclusion of sub-domains, inclusion of cookies, and usage of a defined site map.

In some embodiments, described herein are systems, devices, or methods, wherein the system is further caused to perform a link extraction process, wherein the link extraction process detects one or more URLs within the DOM to be added to the generated list of URLs.

In some embodiments, described herein are systems, devices, or methods, wherein the compliance tests assess one or more testable success criteria as supported by Web Content Accessibility Guidelines (WCAG).

In some embodiments, described herein are systems, devices, or methods, wherein the compliance tests are automatically or manually altered based on evolving web accessibility standards.

In some embodiments, described herein are systems, devices, or methods, wherein the compliance tests determine whether or not one or more specific use-cases are accommodated within the hypertext markup language (HTML) document object model (DOM).

In some embodiments, described herein are systems, devices, or methods, wherein the one or more hardware computer processors in communication with the one or more computer readable storage devices is further configured to execute the plurality of computer executable instructions in order to cause the system to: determine a confidence rating for each of the one or more identified compliance issues.

In some embodiments, described herein are systems, devices, or methods, wherein the one or more hardware computer processors in communication with the one or more computer readable storage devices is further configured to execute the plurality of computer executable instructions in order to cause the system to: determine a confidence rating and/or severity rating for each of the programmatic applications of the one or more remediation code blocks to the corresponding one or more identified compliance issues.

In some embodiments, described herein are systems, devices, or methods, wherein the programmatic application of the one or more remediation code blocks is combined with manual remediations to completely remove the one or more identified compliance issues.

In some embodiments, described herein are systems, devices, or methods, wherein the one or more identified compliance issues comprise at least one of the following: language attribute not set, INPUT missing label, empty anchor, heading missing text, text alternatives missing from non-text content, unnecessary duplication of link description, skip-to link not present, and links do not warn user before opening a new window.

In some embodiments, described herein are systems, devices, or methods, further comprising a real-time auto-detection and audio enablement (RADAE) engine configured to detect web page content and element types.

In some embodiments, described herein are systems, devices, or methods, further comprising a machine-learning engine configured to learn from the programmatic application of the one or more remediation code blocks to the corresponding one or more identified compliance issues, allowing it to create and suggest future programmatic applications.

In some embodiments, described herein are systems, devices, or methods, wherein the machine learning engine learns using supervised, unsupervised, semi-supervised, or reinforcement learning paradigms.

In some embodiments, described herein are systems, devices, or methods, wherein the one or more remediation code databases comprise dynamic link libraries (DLL) or JavaScript object notation (JSON) format databases.

In some embodiments, described herein are systems, devices, or methods for rendering one or more web pages or user interfaces enhanced by an integrated JavaScript, the system comprising: an accessibility server configured to host one or more accessibility processes, wherein the accessibility processes comprise at least one of real-time auto-discovery, audio enablement, or text to speech processing; one or more computer readable storage devices configured to store a plurality of computer executable instructions; and one or more hardware computer processors in communication with the one or more computer readable storage devices and configured to execute the plurality of computer executable instructions in order to cause the system to: receive a request to access a web page from a web browser; retrieve the web page; cause to execute, within the web browser, an integrated JavaScript, wherein executing the integrated JavaScript comprises retrieving, through a network connection to the accessibility server, at least one of the one or more accessibility processes for execution by the web browser; receive a request from the web browser and retrieve remediation code from the JavaScript, the remediation code configured to solve one or more compliance issues of the web page; cause the web browser to render the web page; and cause to execute, within the web browser, the remediation code, wherein execution of the remediation code transforms a document object model (DOM) of the web page into an accessible state.

In some embodiments, described herein are systems, devices, or methods for form-based creation and deployment of remediations to non-compliant web pages or user interfaces, the system comprising: one or more remediation code databases configured to store a plurality of remediation code blocks; an integrated JavaScript code base for creating client-side interactivity with one or more web sites or user interfaces comprising a hypertext markup language (HTML) document object model (DOM), wherein the DOM comprises one or more nodes, the one or more nodes comprising visual elements tagged with alternative text descriptions organized into a DOM tree structure; one or more computer readable storage devices configured to store a plurality of computer executable instructions; and one or more hardware computer processors in communication with the one or more computer readable storage devices and configured to execute the plurality of computer executable instructions in order to cause the system to: provide a dynamic user interface configured to allow creation and application one or more accelerated remediations, wherein the one or more accelerated remediations comprise remediation code and metadata; cause display, through the dynamic user interface, the visual elements of the one or more web sites or user interfaces; evaluate each of the one or more web sites to identify one or more compliance issues, wherein the evaluation comprises loading each of the one or more sites in a headless browser, applying the integrated JavaScript code base, and executing a series of compliance tests; access, from the one or more remediation code databases, one or more remediation code blocks, each remediation code block corresponding to an identified compliance issue; populate a web-based form configured to collect the metadata, wherein the metadata comprises remediation context information; programmatically generate and store one or more accelerated remediation code blocks within the one or more remediation code databases; receive, from the integrated JavaScript code base, a request for one or more accelerated remediation code blocks corresponding to one or more web sites or user interfaces accessed by a user web browser; deliver, to the user web browser, the one or more accelerated remediation code blocks corresponding to one or more web sites or user interfaces accessed by a user; and execute the one or more accelerated remediation code blocks, wherein execution comprises modification of the DOM; wherein all of the accelerated remediation code blocks corresponding to one of the one or more web sites are stored in the same remediation code database.

In some embodiments, described herein are systems, devices, or methods, further comprising a machine learning engine, the machine learning engine configured to: compare the identified compliance issues with one or more previously identified and resolved compliance issues; and ascertain one or more previously executed remediation code blocks that may be applicable to the identified compliance issue from the one or more remediation code databases.

In some embodiments, described herein are systems, devices, or methods, wherein the one or more accelerated remediations can be applied to one or more of the following compliance issues: inadequate ALT-text, link images with missing or inadequate ALT-text, input images with missing or inadequate ALT-text, iFrames missing titles, disordered headers, heading level issues, inputs missing labels, or links missing labels.

In some embodiments, described herein are systems, devices, or methods for identifying structural patterns across a plurality of web pages and determining a set of remediations that can be applied to the plurality of web pages, the method comprising: identifying, by a computer system, within a first document object model (DOM) corresponding to a first web page of the plurality of web pages, a first hierarchal structure, wherein the first web page comprises a plurality of elements, wherein each hierarchy of the first hierarchal structure comprises one or more elements having commonalities in placement, class, or appearance; evaluating, by the computer system, the first web page to identify one or more compliance issues, wherein the evaluation comprises loading the first web page in a headless browser, applying an integrated JavaScript code base, and executing a series of compliance tests; determining, by the computer system, one or more remediations to resolve the one or more identified compliance issues of the first web page; storing, by the computer system, the one or more remediations in a remediation database; identifying, by the computer system, within a second document object model (DOM) corresponding to a second web page of the plurality of web pages, a second hierarchal structure, wherein the second hierarchal structure comprises a substantially identical structural pattern to the first hierarchal structure; and applying, by the computer system, the one or more remediations to the second web page, wherein the computer system comprises a computer processor and an electronic storage medium.

In some embodiments, described herein are systems, devices, or methods for website accessibility monitoring, the system comprising: one or more analytics database engines configured to store one or more page load events received from a plurality of web sites, wherein each of the plurality of web sites comprises tracking code that activates a page load event upon a user loading the website, and wherein the page load event comprises a uniform resource locator (URL) and the date and time of the loading of the website; a data accessibility scanning and testing engine configured to scan one or more of the plurality of web sites and perform one or more accessibility tests; one or more testing database engines configured to store testing data, wherein the testing data is related to the one or more accessibility tests; one or more computer readable storage devices configured to store a plurality of computer executable instructions; and one or more hardware computer processors in communication with the one or more computer readable storage devices and configured to execute the plurality of computer executable instructions in order to cause the system to: request, from the one or more analytics database engine, one or more URLs of the one or more stored page load events; load, by the data accessibility scanning and testing engine using a headless browser, the one or more URLs; perform the one or more accessibility tests on each of the one or more URLs to generate testing data; store, in the one or more testing database engines, the testing data corresponding to each of the one or more URLs; extract, from the one or more testing database engines, metadata corresponding to the testing data corresponding to each of the one or more URLs; and generate a report of the testing data and/or metadata, wherein the report prioritizes one or more results of the one or more accessibility tests.

In some embodiments, described herein are systems, devices, or methods, wherein requesting the one or more URLs comprises one or more URL filtering criteria.

In some embodiments, described herein are systems, devices, or methods, wherein the testing data corresponding to each of the one or more URLs comprises one or more of: the URL, a hash of the URL, the accessibility tests passed by each element of a web page located by the URL, the tests failed by each element, or an aggregate count of accessibility tests passes and failures.

In some embodiments, described herein are systems, devices, or methods, wherein the one or more results of the one or more accessibility tests are prioritized based at least in part on the severity of the one or more results on an accessibility metric, a number of web pages on which the one or more results occurs, and a number of times each web page has been accessed.

In some embodiments, described herein are systems, devices, or methods, wherein the data accessibility scanning and testing engine is further configured to automatically determine a frequency to scan a website of the plurality of websites.

In some embodiments, described herein are systems, devices, or methods, wherein determining the frequency to scan the web site comprises tracking and/or estimating the frequency the website is altered.

In some embodiments, described herein are systems, devices, or methods, wherein tracking and/or estimating the frequency the website is altered comprises one or more or of: monitoring a combination of data points, comparing scanned page HTML or a stored hash to historical versions of the same, comparing changes in failure conditions, comparing changes in fixed errors and risks, fixed errors and risks, or comparing changes in access patterns.

In some embodiments, described herein are systems, devices, or methods, wherein the combination of data points comprises HTTP header metadata.

In some embodiments, described herein are systems, devices, or methods, wherein the failure conditions comprise a total number of identified errors and risks.

In some embodiments, described herein are systems, devices, or methods for filling a web form utilizing a personal information storage system via voice-based interaction, the method comprising: creating, by a computer system based at least in part on a user input via a user access point, a user profile, wherein the user profile is linked to a user identifier; storing, by the computer system, the user profile in one or more user profile databases; receiving, by the computer system via the user access point through a voice platform, a voice command from the user, instructing the personal information storage system to store user information; storing, by the computer system, the user information in the user profile; triggering, by the computer system using web browser technologies and scripting techniques, a voice interaction to authenticate a user, permitting access into a secure, password protected environment; receiving, by the computer system from the user, a voice command from the user, instructing the personal information storage system to insert the user identifier or user information into a fillable web form; and causing, by the computer system, insertion of the user identifier or user information into the fillable web form, wherein the computer system comprises a computer processor and an electronic storage medium.

In some embodiments, described herein are systems, devices, or methods, wherein the user identifier comprises one or more of: an e-mail address or one or more third-party single sign-ons (SSOs).

In some embodiments, described herein are systems, devices, or methods, wherein the user information comprises one or more of: home address, work address, phone numbers, banking information, website addresses, password manager information, payment card numbers and expiration dates, email addresses, salutations, or social security numbers.

In some embodiments, described herein are systems, devices, or methods, wherein the user information comprises free-form information.

In some embodiments, described herein are systems, devices, or methods, wherein the user information comprises a personalization override, wherein the personalization override comprises a first alphanumerical string that corresponds to a voice-command comprising a second, unique alphanumerical string.

In some embodiments, described herein are systems, devices, or methods for executing a series of computer functions in response to a single user voice-command, the method comprising: receiving, by a voice command platform from a user via a user access point, a voice command; converting, by a computer system, the voice command to a user intent; retrieving, by the computer system from one or more intent databases, a series of computer functions corresponding to the user intent; and causing, by the computer system, execution of the series of computer functions, wherein the computer system comprises a computer processor and an electronic storage medium.

In some embodiments, described herein are systems, devices, or methods, wherein converting the voice command to the user intent comprises transmitting the voice command to one or more automatic speech recognition (ASR) and/or natural language processing (NLP) systems.

In some embodiments, described herein are systems, devices, or methods, wherein causing execution of the series of computer functions comprises programmatically emulating the actions that the user would take to manually complete the series of computer functions.

In some embodiments, described herein are systems, devices, or methods, wherein the series of computer functions are executed across multiple pages or within multiple views within a Single Page Application (SPA).

In some embodiments, described herein are systems, devices, or methods, wherein causing execution of the series of computer functions comprises providing the user with a visual indicator or other assistive technology to indicate a series of user actions which sequentially complete the series of computer functions.

In some embodiments, described herein are systems, devices, or methods for dynamically routing voice commands to natural language processing (NLP) and/or automatic speech recognition (ASR) systems, the system comprising: a voice engine communicatively coupled to a plurality of NLP and/or ASR systems and configured to route voice commands to one or more of the plurality of NLP and/or ASR systems; one or more computer readable storage devices configured to store a plurality of computer executable instructions; and one or more hardware computer processors in communication with the one or more computer readable storage devices and configured to execute the plurality of computer executable instructions in order to cause the system to: receive, from a user via a user access point, a voice command; determine, by the voice engine based on contextual data, a first NLP and/or ASR system of the plurality of NLP and/or ASR systems to which the voice command is to be sent for processing; route the voice command to the first NLP and/or ASR system; receive, from the first NLP and/or ASR system, a first resulting output intent; and cause execution of a computer function based on the received first resulting output intent.

In some embodiments, described herein are systems, devices, or methods, wherein the system is further caused to: determine, by the voice engine based at least in part on the contextual data and the first resulting output intent, a second NLP and/or ASR system of the plurality of NLP and/or ASR systems to which the voice command and/or first resulting output intent is to be sent for processing; receive, from the second NLP and/or ASR system, a second resulting output intent; compare, by the voice engine, the first resulting output intent and the second resulting output intent; dynamically determine a final intent to be executed based on the received first resulting output intent, the second resulting output intent, and one or more internal intent rules; and cause execution of a computer function based on the determined final intent.

In some embodiments, described herein are systems, devices, or methods, wherein the system is further caused to: prompt the user to provide contextual data or additional information based on the first resulting intent received from the first NLP and/or ASR system; determine, by the voice engine based on the user-provided contextual data and the first resulting output intent, a second NLP and/or ASR system of the plurality of NLP and/or ASR systems to which the voice command and/or first resulting output intent is to be sent for processing; receive, from the second NLP and/or ASR system, a second resulting output intent; compare, by the voice engine, the first resulting output intent and the second resulting output intent; dynamically determine a final intent to be executed based on the received first resulting output intent, the second resulting output intent, and one or more internal intent rules; and cause execution of a computer function based on the determined final intent.

In some embodiments, described herein are systems, devices, or methods, wherein the contextual data includes one or more of: content of the voice command, content of a web site being viewed by the user, contents of a preconfigured user profile, date and time of the voice command, length of the voice command, language of the voice command, level of background noise within a voice command audio file, or amplitude of the voice command.

In some embodiments, described herein are systems, devices, or methods for a voice-enabled kiosk, browser, or point-of-sale user interface system, the system comprising: a voice input device configured to receive user voice commands; an integrated JavaScript engine configured to facilitate natural language processing (NLP) and/or automatic speech recognition (ASR) and voice command execution; one or more computer readable storage devices configured to store a plurality of computer executable instructions; and one or more hardware computer processors in communication with the one or more computer readable storage devices and configured to execute the plurality of computer executable instructions in order to cause the system to: receive, from a user via a user access point, a voice command; route the voice command to a natural language processing (NLP) and/or automatic speech recognition (ASR) for processing; receive, from the natural language processing (NLP) and/or automatic speech recognition (ASR), a text output of the voice command; interpret, by the integrated Javascript engine, a user intent based on the text output of the voice command received from the natural language processing (NLP) and/or automatic speech recognition (ASR); and cause execution of a computer function based on the interpreted user intent.

In some embodiments, described herein are systems, devices, or methods, wherein the voice input device is an integrated microphone.

In some embodiments, described herein are systems, devices, or methods, wherein the voice input device is a secondary device, wherein the secondary device is paired remotely to one or more of the voice-enabled kiosk, browser, or point-of-sale user interface system.

In some embodiments, described herein are systems, devices, or methods, wherein natural language processing (NLP) and/or automatic speech recognition (ASR) is at least partially completed internally by the integrated JavaScript.

In some embodiments, described herein are systems, devices, or methods, wherein natural language processing (NLP) and/or automatic speech recognition (ASR) is completed by a third-party service.

In some embodiments, described herein are systems, devices, or methods, further comprising a custom function processor configured to interpret a voice command tied to common behaviors, wherein the custom function processor bypasses natural language processing (NLP) and/or automatic speech recognition (ASR) to generate a user intent.

It should be noted that the various embodiments described herein, while illustrated in the context of websites, web browsers, and stand-alone kiosks, are not so limited. Those skilled in the art will appreciate that the systems, devices, and methods described herein may contemplate any paradigm in which assistive technologies may be brought to bear to enhance a user experience.

Moreover, while various embodiments are described as using AE JavaScript, it is understood that any approach which augments existing code to remediate compliance issues and integrate assistive technologies to enhance the user experience is contemplated by the embodiments described herein. In addition, the various software modules described herein may be implemented in a variety of software languages and/or database structures.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

The features, aspects and advantages of the embodiments of the inventions are described in detail below with reference to the drawings of various embodiments, which are intended to illustrate and not to limit the inventions. The drawings comprise the following figures in which:

FIG. 10 illustrates an example output table and impact analysis performed in connection with a monitoring system in accordance with various embodiments herein;

DETAILED DESCRIPTION

Figure 1:
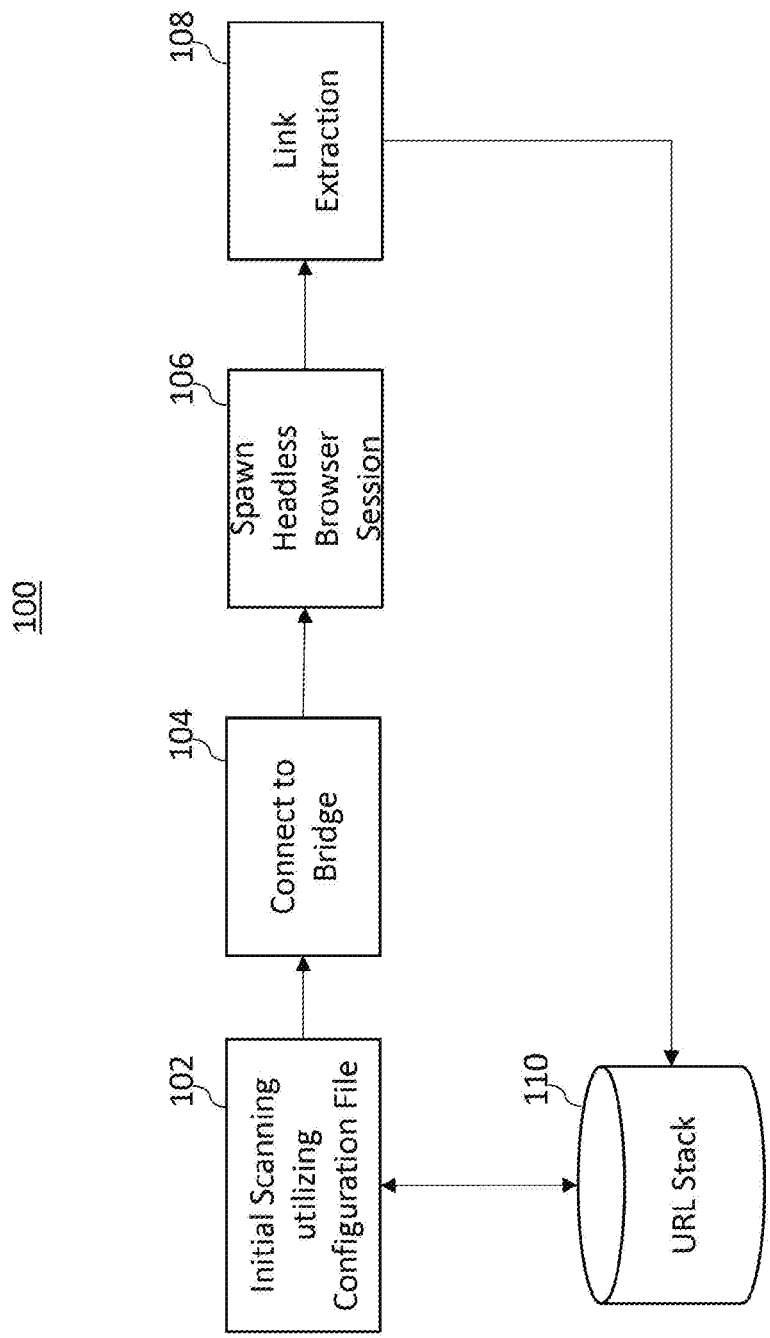
FIG. 1 is a schematic flow diagram of a web crawler process for scanning websites in accordance with various embodiments herein.

The following detailed description is merely exemplary in nature and is not intended to limit the embodiments or the application and uses of the embodiments described herein. Furthermore, there is no intention to be bound by any theory presented in the preceding background or the following detailed description.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of some specific embodiments of the inventions. In addition, embodiments of the inventions can comprise several novel features and no single feature is solely responsible for its desirable attributes or is essential to practicing the inventions herein described.

Various embodiments described herein relate to systems, devices, and methods for bringing websites and other user interfaces into compliance with applicable standards to thereby facilitate enhanced accessibility. Various embodiments herein allow, for example, developers and non-technical content publishers to voice-enable their website and web applications. In some embodiments, the systems, devices, and methods described herein relate to, for example, a cloud-based dynamic user interface that provides a practical means of adding voice-controller to their web-based ecosystems. Some embodiments herein relate to adding voice-driven controls to any web environment enabled with the JavaScript technology described herein. Various embodiments herein provide a dynamic user interface to configure custom controls and define custom actions to be associated with the anticipated end-user intent supplied through, for example, voice-commands. Presently known screen readers, voice command systems, and other assistive technologies are disadvantageous because of their limited ability to remediate sites which do not comply with industry recognized best practices, such as the Web Content Accessibility Guidelines (WCAG) 2.0, Accessible Rich Internet Applications (WAI-ARIA), Authoring Tool Accessibility Guidelines (ATAG), Section 508 Standards & Technical Requirements, and other existing and forthcoming national and international standards and guidelines.

In various embodiments, bringing websites and user interfaces into compliance, such that accessibility functions can be added, is accomplished by scanning websites and programmatically detecting issues in a robust and efficient manner, and injecting code into the HTML document object model (DOM) to facilitate both programmatically and manually remediating noncompliance issues, as described in greater detail below. In some embodiments, the system is configured to conduct one or more compliance tests. In some embodiments, the tests conducted by the system can be focused on the testable success criteria as supported by the Web Content Accessibility Guidelines (WCAG) 2.0/2.1 or other web accessibility standards. In some embodiments, the tests conducted by the system can be automatically or manually altered based on evolving web accessibility standards. In some embodiments, the system may conduct hundreds of tests to understand, for example, whether or not specific use-cases (i.e. disability use-cases) are accommodated (accounted for) within the code or the way in which the elements are presented in the DOM. In some embodiments, not all accessibility element criteria may be programmatically testable and in the case of those that are not, the system may associate remaining testable success criteria with the pages/elements identified in a crawling or "seeding" process. In some embodiments, the system can be configured to determine a confidence rating for an identified compliance issue. In some embodiments, an issue may be determined with a confidence rating of 100%, such that the system is certain that an issue exists. In some embodiments, compliance issues having a confidence rating above a predetermined threshold may eligible for automatic remediation. In some embodiments, common issues which may be automatically remediated may include, but are not limited to, language attribute not set, INPUT missing label, empty anchor, heading missing text, text alternatives missing from non-text content, unnecessary duplication of link description, skip-to link not present, and links do not warn user before opening a new window.

More particularly, web pages and other electronic documents, and/or documents otherwise accessible through a graphical user interface (GUI) may have an established reading order embodied in the DOM, including visual elements that are tagged with alternative text descriptions. The nodes of the document may be organized in a tree structure, called the DOM tree. In some embodiments, when an HTML page is rendered, a browser may download the HTML into local memory and may automatically parse it before, during, or after displaying the page.

The W3C Document Object Model (DOM), a W3C (World Wide Web Consortium) standard for accessing documents, can comprise a platform and language-neutral interface that may allow programs and scripts (such as JavaScript) to dynamically access and update the content, structure, and style of an electronic document. In some embodiments, the HTML DOM may be a standard object model and programming interface for HTML, and may define the properties of some or all HTML elements and the methods for accessing the HTML elements. In other words, the HTML DOM can act as a standard for how to acquire, change, add, delete, or otherwise interact with HTML elements.

In the context of various embodiments, objects in the DOM tree may be addressed and manipulated by an integrated JavaScript code base available from AudioEye, Inc. (AE) at www.audioeye.com, sometimes referred to herein as the AE JavaScript. The AE JavaScript can create client-side interactivity with objects in the DOM tree. In some embodiments, the Javascript plug-in can identify and solve digital accessibility issues automatically or by allowing a user to manually remediate online content. In some embodiments, the system can target elements of the DOM and add additional or missing attributes to allow web content to effectively communicate with, for example, an accessibility API. In some embodiments, additional non-visual elements can be added to the DOM to improve an assistive technology user experience. In some embodiments, the system may use a test-centric approach to fixing accessibility issues and applying remediations. In some embodiments, remediations can be applied based on a real-time specific test failure condition. In some embodiments, if no test failure conditions are identified by the system, no remediations are applied. In some embodiments, tests can be re-run periodically or upon user request. In some embodiments, the system fixes accessibility issues by utilizing a library of automatic remediations. In some embodiments, automatic remediations can be equally applicable to all websites and can be utilized to improve the accessibility of any website. In some embodiments, manual remediations can be custom, site-specific functions designed to remediate unique issues on a given page/site/application. In some embodiments, automatic remediations may be combined with manual remediations to completely remove accessibility issues with on a web page. In some embodiments, remediations can be applied by the system without access to the source code of a web page or application to be remediated.

In some embodiments, when an end-user accesses a website enabled with the techniques described herein, a version of the AE JavaScript is one of the components that loads on that page. When loaded, the JavaScript may inject appropriate compliance fixes (also referred to as remediations) into the page. In some embodiments, screen readers (e.g. JAWS, NVDA, Voice Over, etc.) can read and process the page, leveraging various compliance remediation techniques applied to the page. Specifically, the AE JavaScript can check for specific non-conformance issues and, if detected, programmatically fix them.

In various embodiments, the AE JavaScript may enhance the user experience using a series of secure communication links with cloud-based or integrated services, in conjunction with various browser techniques. For example, a real-time auto-detection and audio enablement (RADAE) engine can detect page content and element types. In some embodiments, through cascading style sheet (CSS) selector identification and techniques similar to x-path, the AE JavaScript may recognize individual HTML entities based on their placement within the DOM and their tag or other identifier. The AE JavaScript may apply rules programmatically that make modifications to elements contained within the DOM, facilitating enhanced user accessibility. In some embodiments, only page markup is altered, not the underlying content. In this way, the original versions of websites remain unaltered when viewed without assistive technologies. In other embodiments, both the page markup and the underlying content can be altered.

In accordance with some embodiments, the systems herein may crawl (spider) websites and gather pages to be analyzed in an evaluation phase. In this regard, various scanning parameters including, for example maximum crawl time and level of recursion (sometimes referred to as page depth) may be configurable by a system administrator or automatically configured. However, in some embodiments, web crawling is only one way to establish an inventory of pages/sites/elements that are to be tested, tracked, and audited via the platform. In some embodiments, such seeding may occur from the results of the JavaScript being embedded on a customer or user site in which case the site traffic and the pages which may be "hit" or accessed by end-users of those sites embedding the AudioEye JavaScript may be stored and used to seed the system with the inventory that is intended to be tracked/audited. In some embodiments, other methods may also be used to "push" information into the system to be tested. In some embodiments, information may be tested in a browser, and the test results may be introduced into an authorized account, which can be retrieved by an authorized user (e.g. a user uses a browser plug-in to conduct tests in their browser session of an authenticate session within a Single Page Application (SPA) and test results are sent programmatically via, for example, an API, to a pre-defined account within the system for future retrieval/archival/reporting/auditing/etc.).

In some embodiments, the system can individually evaluate each URL (page) for WCAG or similar compliance issues. For each identified compliance issue, the system may programmatically fix the issue by using a platform-default block of remediation code (also referred to herein as auto-remediation), programmatically fix the issue by using a manually-generated block of remediation code (also referred to herein as manual remediation), or alert a human operator to do so. For programmatic as well as manual fixes, the system may utilize one or more code blocks from one or more remediation libraries, for example, in a dynamic link library (DLL), JavaScript object notation (JSON) format database, or other structured storage mechanism. In some embodiments, the system may be configured to generate and display a dynamic user interface to a user to manage the remediations. The dynamic user interface may have enhanced usability such that a non-coder/non-developer can simply use a web form to fix issues of accessibility. In some embodiments, the dynamic user interface may change and react according to specific remediations to be performed. In some embodiments, the dynamic user interface may be able to facilitate all types of remediations. However, in some embodiments, certain issues of accessibility are conducive to being remediated through the dynamic user friendly interfaces. In some embodiments, non-conducive remediations can either be remediated through automation or manual remediation coded by, for example, a Subject Matter Expert/JavaScript Engineer. In some embodiments, in the case of Auto-Remediation, the system may complete remediations without displaying a user interface. The system may complete remediations without any user or admin involvement at all. In some embodiments, the system programmatically detects an error with about 100% certainty and fixes the issue with about 100% certainty. In some embodiments, the system may make remediations without negatively impacting any other elements that might be on the page/view. In some embodiments, the manual remediations can be configured by developers writing JavaScript, which may be configured in the Admin (snippets of JavaScript). In some embodiments, the manual remediations may be published via the JavaScript payload delivered to the client sites that have embedded the script, fixing issues of accessibility as programmatically configured/authored by authorized users of the platform.

The system may suitably implement individually, or in combination, manual, GUI-based, and automated remediations by acquiring remediation code during the AE JavaScript loading process, and apply appropriate remediation code to the rendered content. Remediation code may be acquired as part of the AE JavaScript's initial payload, from a specific URL, or from the AE hosting infrastructure.

In various embodiments, remediations immediately manipulate the DOM, causing the corrections and enhancements to take effect at the time the content has finished loading and rendering. In some embodiments, keyboard users may be able to use standard keys, such as tab or any other key or combination of keys, to navigate through the remediated page, regardless of whether a screen reader or other AT is being utilized, reaping the benefits of the applied DOM manipulations in real time. For users that do not use a stand-alone or native screen reader, the AE JavaScript can comprise a player function which may be configured to read the remediated page aloud, as described in greater detail below.

Figure 2:
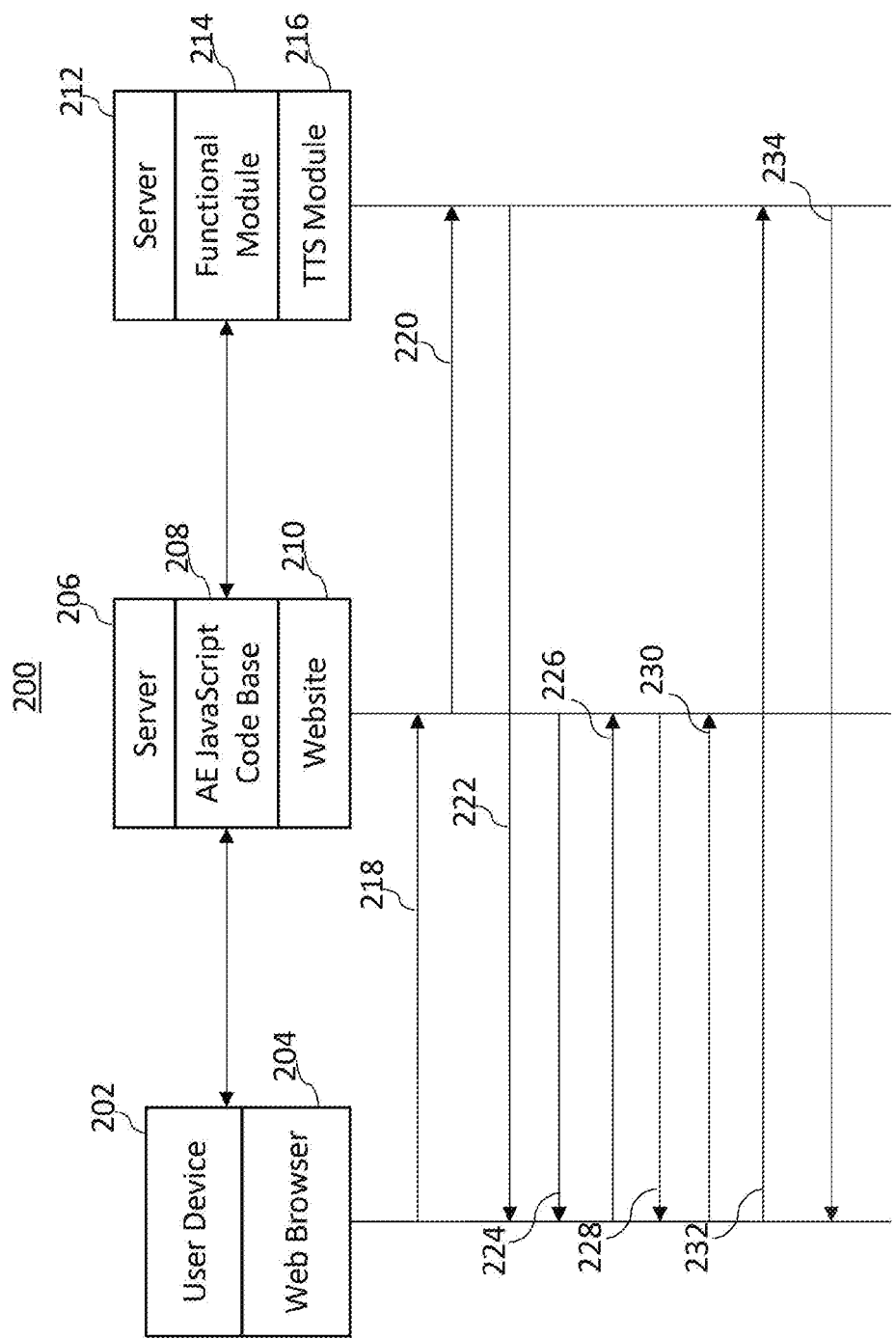
FIG. 2 is a combined schematic block and schematic flow sequence diagram illustrating exemplary systems, devices, and methods for rendering an AE JavaScript enhanced web page or other user interface components in accordance with various embodiments herein.
Figure 3:
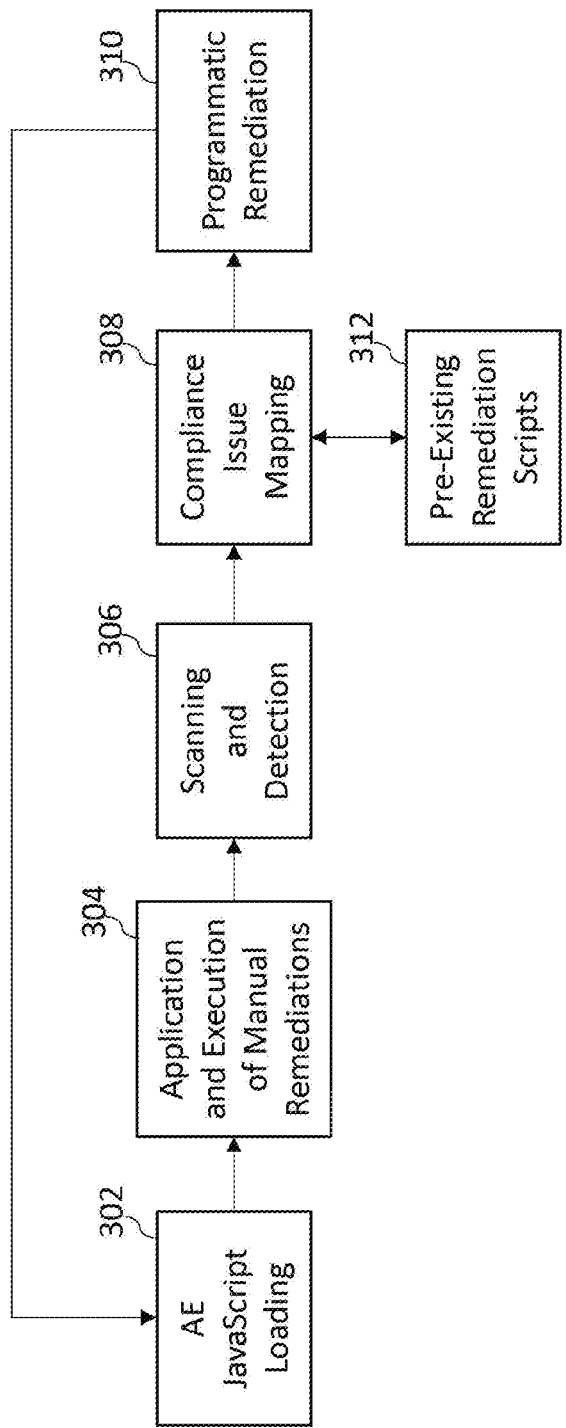
FIG. 3 is a schematic flow diagram illustrating an exemplary remediation delivery system in accordance with various embodiments herein.

FIGS. 1-3 together illustrate a remediation environment in accordance with various embodiments. More particularly, FIG. 1 is a schematic flow diagram of an example embodiment of a crawler or "spider" process 100 capable of generating a list of URLs to be included as part of an initial, ongoing, or point-in-time compliance assessment or scan of a website. In particular, the process 100 may utilize a configuration file (stored locally or received from an external source) to determine the depth of the scan, typically expressed in terms of page depth or levels of recursion, the maximum run time, and the starting URL. The starting URL can be added as the first element to a page stack or memory 110. Other advanced configuration options may be available, allowing for configuration of a User Agent, browser dimensions, starting page, an option to include subdomains in the scope, cookies to include in requests, usage of a defined Site Map in place of spidering, among others.

With continued reference to FIG. 1, in some embodiments, when the AE JavaScript commences the initial scanning phase, the system may connect to a bridge 104 which spawns a headless browser session (i.e., PhantomJS, Selenium Grid, Google Chrome, Mozilla FireFox) 106. Successive URLs can be retrieved and rendered by a link extraction process 108 which may detect some or all links within the rendered DOM and may add unique URLs to the stack 110. The process 100 may retrieve successive URLs from the stack and continue crawling until the site is fully cataloged, timeout is reached, or page depth has been exhausted. In the event that the number of pages returned by the spidering process is below a configurable threshold, alternate failover techniques can be utilized to obtain the list of pages, including utilizing Internet search engines to request some or all indexed pages matching the spider configuration parameters. In some embodiments, if less than a predetermined number of pages are returned, the system can use a web tool such as cURL to request "searchprovider.com/q=site:xyz.com". Google can return a first results page with a first number of pages in its index for the requested domain. The system can store the unique URLs returned on the results page and run cURL again, requesting one or more additional results pages. The system can continue iterating through this loop until there are no more results pages, or until the system has gone through two or more results pages without adding any additional unique URLs to the list.

In some embodiments, after the crawler or "spider" process is complete, the scanning process initiates. In some embodiments, the scanning process ingests a set of pages, which may be manually configured, attained, for example, via the foregoing crawl/spider process or a variant thereof, or from previous scans. In some embodiments, once ingested, the scanning process can iterate through each unique URL, loading the page in a headless browser, applying the AE JavaScript, executing a series of tests, and ultimately delivering the results of the scan back to another process, system, or storage medium.

In some embodiments, once the website is scanned and initial fixes implemented (e.g. through the inclusion of the AE JavaScript), site developers may access a development portal and attend to manual fixes, as discussed in greater detail below. Concurrently, users may access the remediated site and enjoy the resulting enhanced user experience even before manual remediation is complete.

Referring now to FIG. 2, a combined schematic block and schematic flow sequence diagram 200 illustrates an exemplary apparatus and method for rendering a web page or other AE JavaScript enhanced user interface in accordance with various embodiments herein.

More particularly, the system may comprise a user device 202 suitably equipped with a web browser 204, a first server 206 configured to host a website 210 enhanced with an integrated AE JavaScript code base 208, and a second server 212 configured to host various processes and services accessible by the first server including, for example, a RADAE or analogously functional module 214 and a TTS module 216. It will be understood that the use of the phrase "server" in conjunction with items 206 and 212 is not intended to be limiting, and that this entity may include a wide range of infrastructure components, such as multiple servers of various types, load balancers, routers, switches, and the like.

In accordance with various embodiments, the browser 204 may request a web page (218) from the first server 206, whereupon the AE JavaScript 208, executing in the browser 204, retrieves the RADAE module (220) from the second server 212 and returns the RADAE module to the user device 202 for execution by the web browser 204 (222). The first server may also send the HTML page to the browser (224). The browser may request any additional resources (226), whereupon the AE JavaScript may return remediation code (228) and the page can be rendered. In some embodiments, once rendered, the remediation code may execute, transforming the DOM into an accessible state. In some embodiments, transforming the DOM may comprise remediating elements by tagging them with appropriate labels and attributes that may help facilitate communication with Assistive Technologies, such as screen readers. In some embodiments, the system may also dynamically insert off screen messages and ARIA labels and other best practices that are intended for consumption by the Screen Reader.

With continued reference to FIG. 2, in some embodiments, when the browser requests page content (230), such as a text-to-audio conversion, the AE JavaScript 208 running in the local browser 204 may request audio from the second server 212 (232), and the audio may be passed directly back to the browser 204 for playback to the user (234). In some embodiments, the AE JavaScript facilitates a modular implementation of various ATs, including, for example, an audio player function, a reader tool suite (e.g., font face/size, magnification, contrast, line/letter spacing), a voice command feature, a normalized keyboard-friendly site menu, and a page elements menu.

FIG. 3 is a schematic flow diagram illustrating an exemplary remediation delivery process. In some embodiments, once the AE JavaScript loads (302), manual remediations present in the configuration can be applied and executed (304). A scanning and detection system can scan the page to detect compliance issues (306). Using, for example, a heuristics engine, detected compliance issues can be mapped (308) to pre-existing remediation scripts 312 and programmatic remediation can be executed/applied (310) for each mapped compliance issue.

Figure 4:
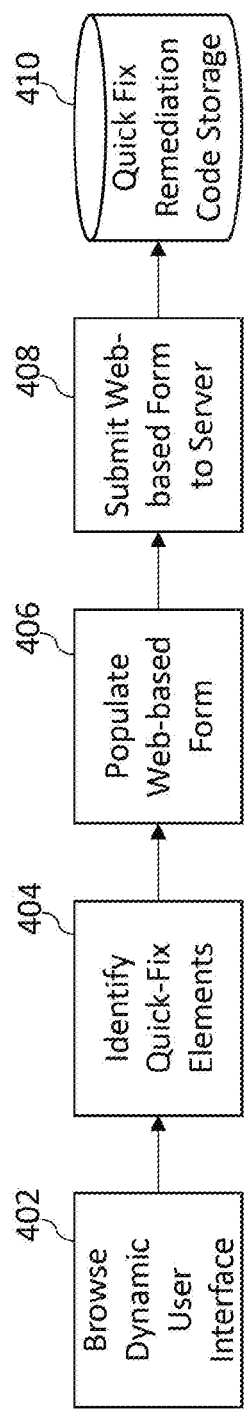
FIG. 4 is a schematic flow diagram illustrating an exemplary "quick fix" remediation system in accordance with various embodiments herein.
Figure 5:
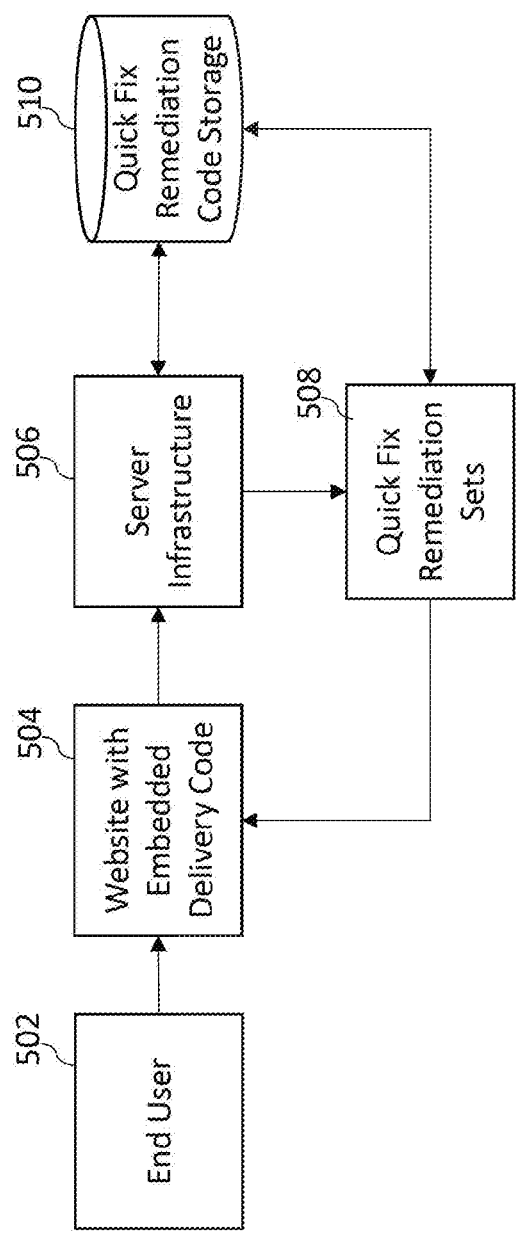
FIG. 5 is a schematic flow diagram illustrating an exemplary method of delivering a "quick fix" remediation in accordance with various embodiments herein.

FIGS. 4 and 5 are schematic flow diagrams illustrating creation and delivery of form-based or "quick-fix" remediations in accordance with various embodiments. In accordance with these techniques, remediations that would otherwise require coding techniques can be created and deployed utilizing a simplified dynamic user interface. As used herein, the phrases "quick-fix" and "quick-fix code" refer to code (e.g., JavaScript code) that, with the addition of some metadata to be provided by an admin, can be used to generate actual remediation code.

More particularly, referring to FIG. 4, an exemplary process may begin with an admin (or other user authorized to create remediation code) browsing a dynamic user interface (UI) (402), and identifying one or more elements for which quick fixes are potentially applicable (404). Example quick-fixes include, without limitation, missing or inadequate ALT-text, link images with missing or inadequate ALT-text, input images with missing or inadequate ALT-text, iFrames missing titles, headers out of order (heading level issues), inputs missing labels, and links missing labels.

The admin or authorized user may populate a web-based form (406) that can collect data (e.g., metadata) that may be required for performing the remediation, including the context in which the fix is to be applied. Such context might include, for example, the scope of the required remediations in terms of instances and pages (e.g., this instance alone, all instances of this issue on one page, all instances of this issue on every page, etc.).

In some embodiments, the admin or authorized user may submit the web-based form to the server infrastructure (408), whereupon the remediation code 410 can be programmatically generated and stored. In some embodiments, all quick-fix remediations of the same type (e.g., image ALTs) can be stored together in the same remediation storage location for a given website.

Referring now to FIG. 5, in some embodiments, after the creation and storage of quick-fixes, an end-user 502 may browse a website 504 that has the quick-fix delivery code embedded therein (e.g., via the AE Javascript). The delivery code can request applicable fixes from server infrastructure 506, which may pull the appropriate quick-fix remediation sets 508 from database 510 (or via an appropriate caching mechanism), and may deliver the code to the browser being used to access website 504. In some embodiments, once code 508 is received by the browser, it can be executed, performing the necessary DOM modifications created previously, for example, via the process described above in conjunction with FIG. 4.

In this regard, while the quick-fix remediation process is described in the context of a traditional web form, the various embodiments are not limited. A variety of other user interfaces may be utilized in a way that obviates the need for traditional coding processes, which often require the creation of text documents that are subsequently compiled, interpreted, or converted to an intermediate form of code. Stated another way, in the context of the AE JavaScript, the admin need not be familiar with the particular syntax and semantics of programming languages such as JavaScript.

Figure 6:
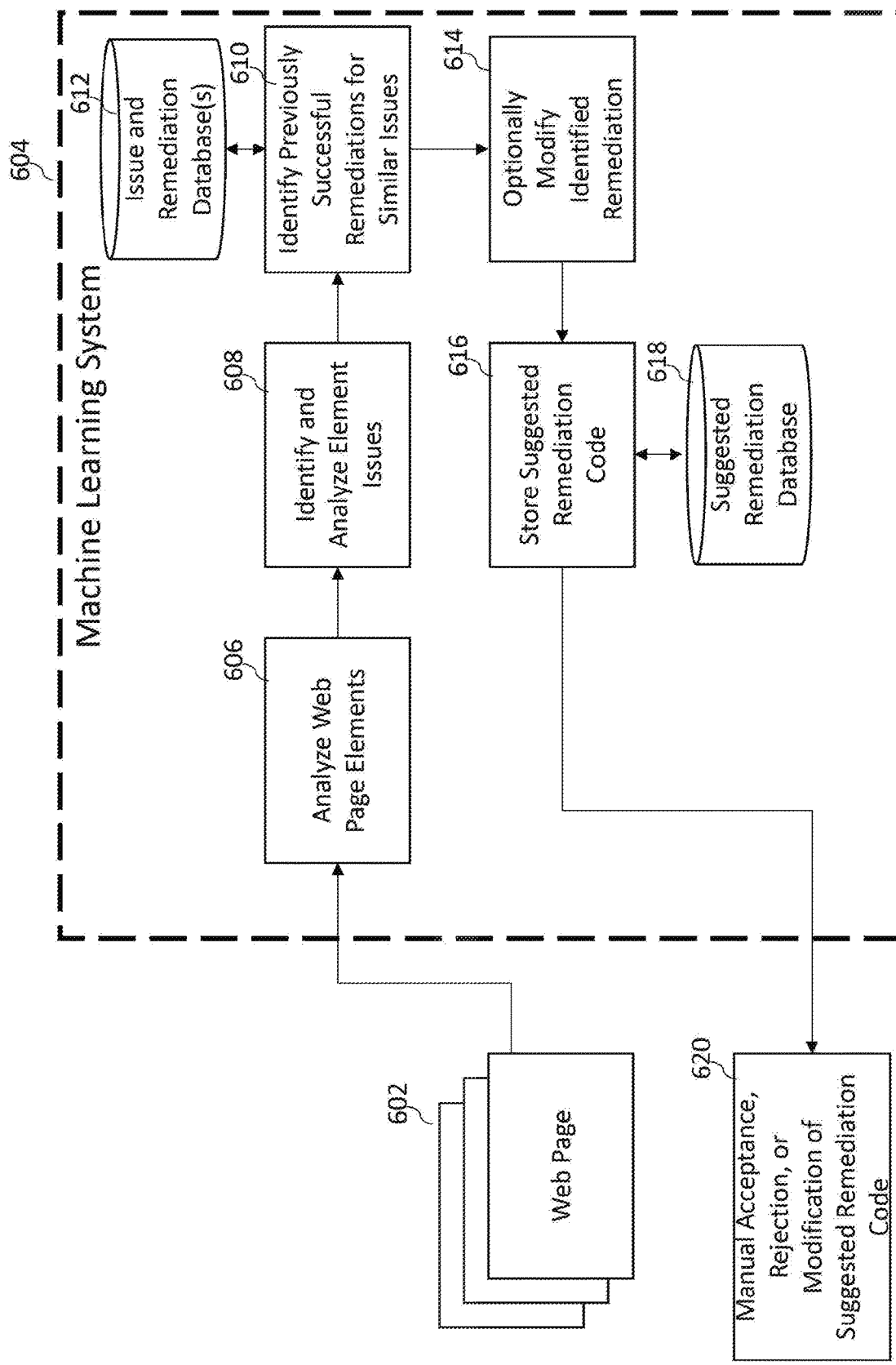
FIG. 6 is a schematic flow diagram illustrating an exemplary remediation process incorporating a machine learning component in accordance with various embodiments herein.

FIG. 6 is a schematic flow diagram illustrating an exemplary remediation process incorporating a machine learning system in accordance with various embodiments. More particularly, when provided with a set of remediations generated in any suitable fashion (e.g., manually, programmatically, and/or via the quick-fix paradigm described above), a machine learning system in accordance with various embodiments may be configured to learn from past remediation history, allowing it to create and suggest future fixes based on past experience.

In accordance with various embodiments, machine learning system 604 may identify and analyze a set of issues (608) associated with a set of analyzed web page elements (604) from one or more web pages 602. In some embodiments, the system can compare the identified issues with previously identified and resolved issues, and ascertain a previously applied remediation that may be applicable to the current issue (610) from one or more issue and remediations databases 612. In other words, the system may identify remediation code created previously that would likely resolve a current issue. Machine learning system 604 may then be able to recall, and possibly modify, existing remediations (614) such that they are tailored to address the specific instance identified by the scanning system.

In some embodiments, once the machine learning system 604 has identified a remediation (610) that is applicable, the system may store the suggested remediation code (616) in a suggested remediation code database 618. The admin or authorized user may then be able to browse through identified issues using a suitable user interface (e.g., web-based graphical user interface), select an individual issue, and view the suggested remediation code. The admin may then reject the remediation code, accept the code as presented, or modify the code manually to address the identified issue (620).

In some embodiments, as training of machine learning system 604 continues, it may utilize data gathered from the process to determine a confidence level associated with each remediation that it generates or suggests. For example, the system 604 may determine with 96% confidence, based on, for example, past results, that a particular image requires a modified ALT text. In some embodiments, once the confidence level is greater than a predetermined threshold (e.g., about 99%, about 98%, about 97%, about 96%, about 95%, about 90%, about 85%, about 80%, about 75%, about 70%, etc.), the system may be configured to automatically apply remediations 604 without requiring that an admin approve each instance. In some embodiments, the admin or authorized user has the ability to review automatically applied remediations and modify or disable them as deemed appropriate.

Machine learning system 604 may be implemented in a variety of ways, and may be trained using supervised, unsupervised, semi-supervised, or reinforcement learning paradigms. Machine learning system 604 may perform classification (e.g., binary or multiclass classification), regression, clustering, dimensionality reduction, and/or other such tasks. Examples of suitable machine learning models include, without limitation, artificial neural networks (ANN), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), and/or linear discriminant analysis models.

In accordance with some embodiments, common templates or structural patterns can be identified across multiple pages of a website, allowing the system to determine a set of remediations that can be applied to multiple pages without incurring the time and expense of separately analyzing and determining fixes for each of the pages separately. This identification of templates may be performed by any of the systems described previously, such as server 206 of FIG. 2.

Figure 7:
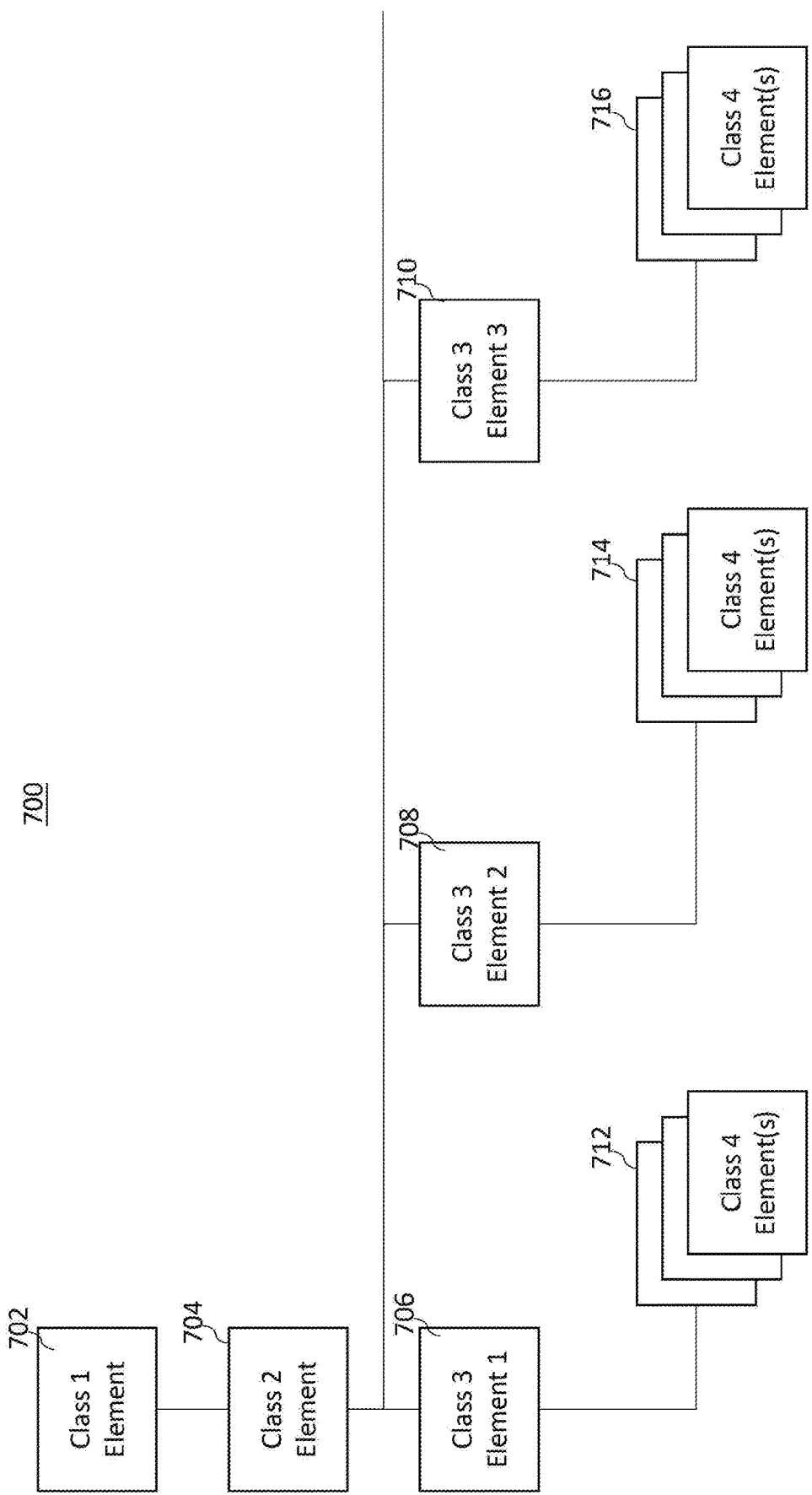
FIG. 7 is a schematic block diagram illustrating an exemplary template identification scheme utilizing a DOM structure in accordance with various embodiments herein.

Templates may be identified in a number of ways—e.g., by one or more of, identifying patterns in DOM structure, identifying patterns in URL structure, and identifying patterns in accessibility test results. More particularly, FIG. 7 is a schematic block diagram illustrating template identification utilizing a DOM structure in accordance with various embodiments. That is, consider a DOM 700 corresponding to a particular example web page having a variety of elements (e.g., 702, 704, 706, 708, 710, 712, 714, 716). As illustrated, the elements may exhibit a particular hierarchy or topological structure, which might correspond to commonalities in placement, class, and appearance of web page elements. These similarities in structure and content may then be identified across multiple pages of a website. For example, multiple pages might contain a single main navigation block located in the same place and containing the same content, a single footer region located roughly in the same place in the code and containing the same content, and a main content area that may exist in the same place within the code for all pages but may contain different contents on each page. In such cases, the system might determine that a common template (and therefore a common set of remediations) can be applied to all of the pages fitting that template.

Figure 8:
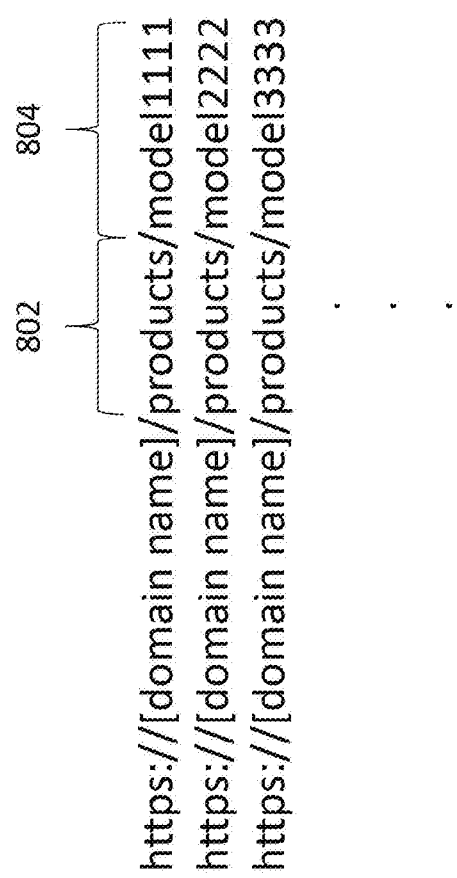
FIG. 8 is a listing of URLs illustrating an exemplary template identification protocol utilizing URL structures in accordance with various embodiments herein.

FIG. 8 illustrates an exemplary common template identification scheme utilizing structured URLs in accordance with various embodiments. That is, FIG. 8 lists an exemplary set of three website URLs each characterized by a path structure in which a path name 802 (e.g., "products") occurs after the domain name, followed by a set of path names 804 that begin with the string "model" and terminate with an alphanumeric string that varies from page to page (e.g., "11111", "2222", "3333", etc.). That is, the URLs might be identified by the system as two instances of the same product detail page. In such a case, the system may identify that the pages exhibiting the illustrated URL pattern correspond to a common template. Those skilled in the art will recognize that this type of URL inspection can apply to additional schemes, including patterns in query strings.

In accordance with another embodiment, patterns in accessibility test results may also be used to identify common templates. That is, using the data from the scanning and/or monitoring systems (as described below), it is possible to cross-reference test successes and failures in order to group web pages together as part of a template.

For example, multiple web pages may include a group of elements that pass one subset of tests, and another group of elements that fail another subset of tests (with, perhaps, varying results for some specific content area of the page). In such cases, the system might conclude that the web pages conform to the same template, with unique content contained within the non-matching areas or elements.

Figure 9:
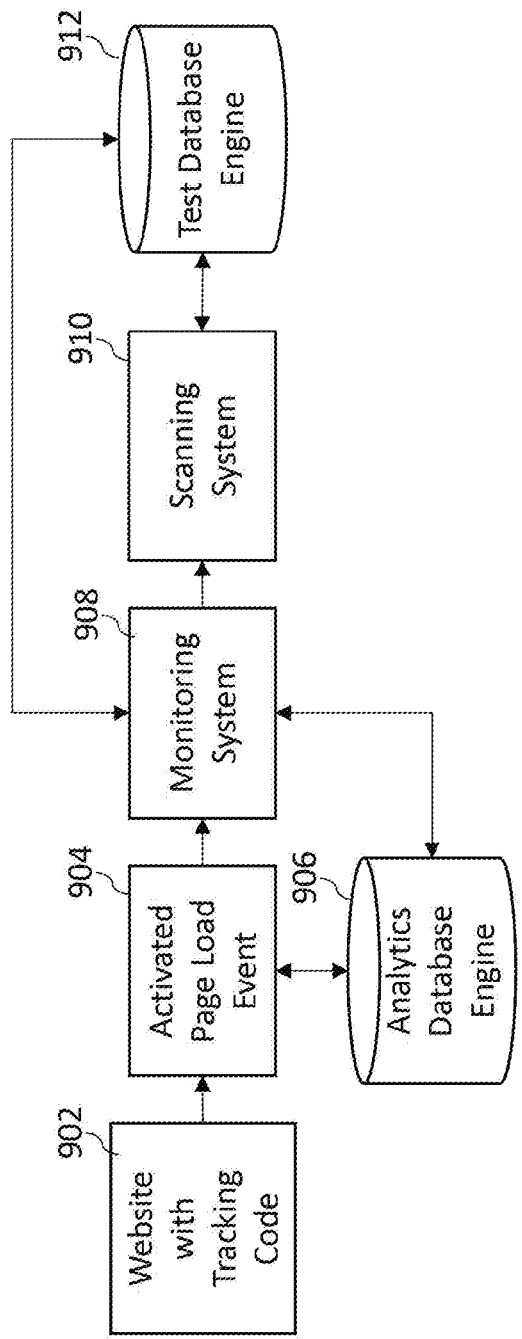
FIG. 9 is a schematic flow diagram illustrating an exemplary monitoring system in accordance with various embodiments herein.

FIG. 9 is a schematic flow diagram illustrating an exemplary monitoring system in accordance with various embodiments. That is, a website 902 may comprise tracking code that may activate an event (e.g., an analytics event) 904 upon each page load by a browser, with one or more page load events being stored within analytics database engine 906. Event 904 includes, in some embodiments, the full page URL and the date and time of the request.

In some embodiments, monitoring system 908 may request some or all unique URLs from analytics database engine 906, subject to some filtering criteria. For example, monitoring system 908 may request some or all URLs and the number of times each URL was requested during a given data range. Monitoring system 908 may send the requested data to accessibility scanning system (or simply "scanning system") 910, which can load (e.g., using a headless browser) each web page and perform a number of accessibility tests. Scanning system 910 can store, in test database engine 912, information relating to the tests—e.g., the full URL, the tests passed by each element, the tests failed by each element, and aggregate counts of test passes and failures. In some embodiments, the database engine used to store results may be a high-performance analytical engine such as Amazon RedShift, enabling big-data analyses to be performed against a large data set, supporting efforts of targeting commonalities within the data set that can be used to prioritize existing issues of accessibility.

Monitoring system 908 can extract data (e.g., metadata) from the test database engine 912 and/or other data sources and can use that data to generate reports and user interfaces that can be used to prioritize issues by their impact. In this regard, the "impact" of an accessibility issue may be characterized by any appropriate metric, including, for example, the severity of the issue, the number of web pages on which the issue occurs, the total number of effected pages, the number of times each page has been accessed, and the like. In some embodiments, monitoring system 908 identifies elements with issues of accessibility and counts the pages in which that element exists. The system then utilizes the traffic data—e.g., the number of times each page was served—to show the admin a list of elements that, if remediated, would optimally impact overall accessibility and compliance.

FIG. 10 illustrates one non-limiting example of an output table 1000 that might be generated by, for example, the monitoring system 908 of FIG. 9. In some embodiments, output table 1000 includes an "element reference" field, an "issue detected" field, an "occurrence count" field, a "pages" field, and an "example page" field. The "element references" field may include a suitable identifier or reference to the element in the DOM. The "issue detected" field may provide a summary of the accessibility issue. The "occurrences" field may indicate, for example the number of times that the subject issue has occurred (which may be a function of how many times a page was accessed). The "pages" field may indicate, for example, the number of pages (e.g., within the website as a whole), that the issue occurred. The "example page" field may describe, for admin convenience, an example page in which the issue has been detected. It will be appreciated that the table illustrated in FIG. 10 is not intended to be limiting, and that any suitable graphical and/or textual representation may be employed.

Figure 11:
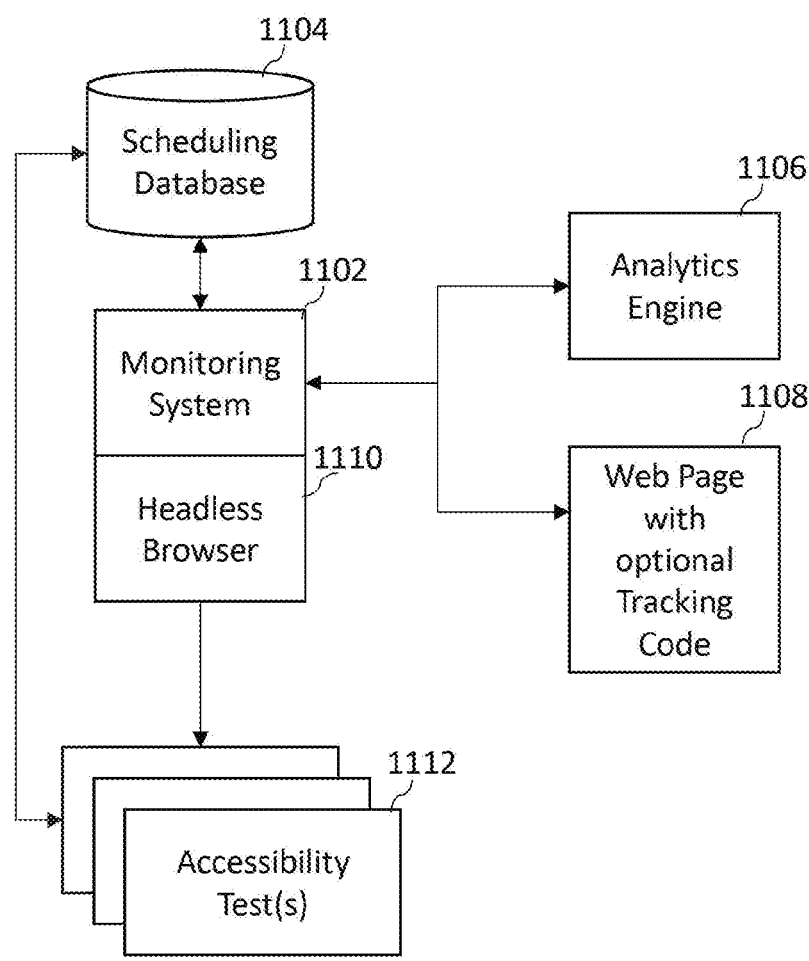
FIG. 11 is a schematic flow diagram illustrating an exemplary automatic scan frequency adjustment system in accordance with various embodiments herein.

FIG. 11 is a schematic flow diagram illustrating an automatic scan frequency adjustment system 1100 in accordance with various embodiments. In some embodiments, monitoring system 1102 (which may be implemented as described above in conjunction with FIG. 9) may automatically determine how frequently a given web page should be scanned for accessibility issues, and may update its scheduling data in a database 1104 or other data source accordingly. In some embodiments, an admin or authorized user may be given oversight with respect to system 1102 and may be provided a way to approve any change request relating to the scanning.

Tracking and/or estimating how frequently a page changes (or may change in the future) can be accomplished in a variety of ways. In some embodiments, this tracking includes monitoring a combination of data points, such as HTTP header metadata (e.g., content-control or last-updated), comparing scanned page HTML (or a stored hash) to historical versions of same, comparing changes in failure conditions, such as total number of identified errors and risks, as well as fixed errors and risks, and changes in access patterns.

In some embodiments, monitoring system 1102 may request page access activity from analytics engine 1106 and/or scheduling database 1104. For each distinct web page 1108 returned (which may include a tracking code for analytics), monitoring system 1102 may load the web page (e.g., in a headless browser 1110) and execute various accessibility tests 1112. The output of accessibility tests 1112 can be stored in database 1104, and may include such items as, for example, test results, analytics data initially received, page HTML, a hash of the HTML, and any other relevant data.

As an example, a particular web page 1108 may include a content-control header that indicates that the page changes daily; however, the monitoring system may determine that, since the hash of its page content has not changed in at least seven days, the page has an update frequency of not more than weekly. In a further example, a header may indicate that a page changes monthly; however, the system may determine that the number of errors identified on that page changes on a more frequent basis, and as such the page may be scanned daily until a more accurate and stable estimate can be determined.

Figure 12:
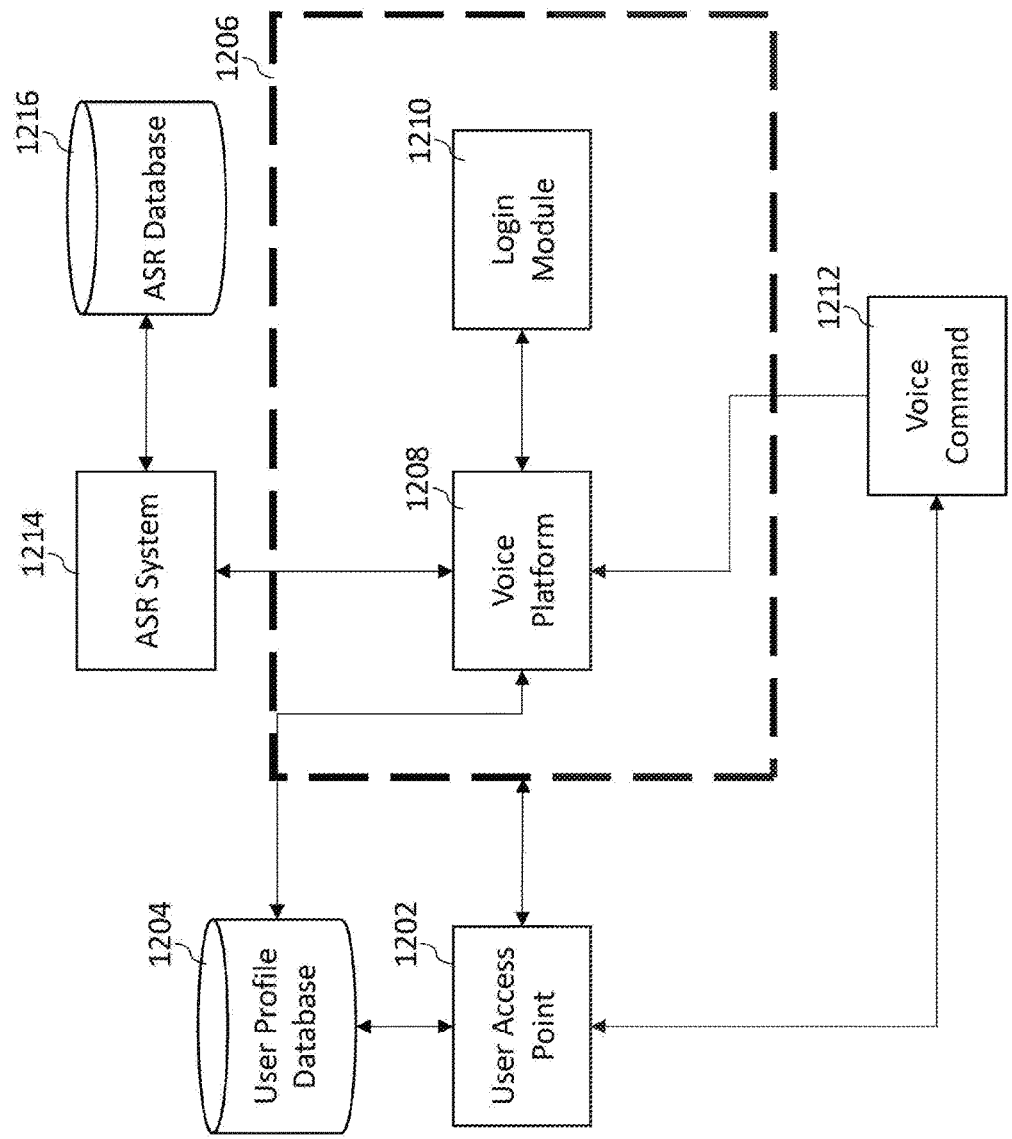
FIG. 12 is a schematic flow diagram illustrating the use of an exemplary personal information store in connection with voice-based interactions in accordance with various embodiments herein.

FIG. 12 is a schematic flow diagram illustrating the use of a personal information store via voice-based interactions in accordance with various embodiments. In general, the personal information store may allow a user to utilize a user profile and voice-based interactions to store and recall information, for example, form fill-out data.

Referring to FIG. 12, the user, through an access point 1202, can create a profile to be stored a user profile database 1204 using either a personal identifier such as, for example, an e-mail address, or a third-party single sign-on (SSO) provider such as, for example, Facebook or Google. In some embodiments, once the user is authenticated by the system, the user may be able to use voice commands to store and recall information.

In some embodiments, the user may visit a website 1206 that may include voice code from a voice platform 1208, and may initiate voice functions via, for example, keyboard or mouse actions. In some embodiments, after completing a login process through a login module 1210 to authenticate with platform 1208, the authenticated user may issue a voice command 1212 instructing the system to store, for example, his or her home address. This may be accomplished, for example, via a speech utterance of the form, "remember my home address is 123 Maple Street, Tucson, Ariz., 85711."

The voice command 1212 can be streamed or otherwise transmitted to platform 1208, where it can undergo local automated speech recognition (ASR) or can be passed off to another internal or external ASR system 1214 for ASR processing. The resulting information can be stored in a ASR database 1216.

Other examples of information that might be stored and recalled via voice commands include, for example, phone numbers, banking information, website addresses, password manager information, payment card numbers and expiration dates, email addresses, salutations, social security numbers, and/or any other alphanumeric string information.

In some embodiments, using web browser technologies and scripting techniques, a voice interaction may be triggered to authenticate a user, permitting access into a secure, password protected environment. As such, a voice command, which may be unique to the individual user, can be spoken and the resulting voice file can be processed by a server to match the recording with a globally and securely stored audio file, as supported by or in conjunction with, for example, Single Sign On Technologies and Technology Providers. Through, for example, a complex, multi-step process or a more pragmatic, heuristic process (e.g. built-in or leveraging secure 3rd party API integrations), the two files can be compared and contrasted. In some embodiments, when a match is programmatically determined, the user can be authenticated permitting access to the secured environment.

In some embodiments, when a user visits a web page that includes inputs for addresses or the like, the user may issue a voice command 1212, such as "fill form with my home address" or "insert cellular phone number." The voice code can request the home address data or other applicable information from platform 1208, which can fill the appropriate field or fields with the stored data.

The above embodiments may be employed with web form inputs, such as, for example, address, contact info, payment info, and the like, but may also accept free-form information for storage, recollection, and transmission. For instance, a user may configure the system to store his work email address, and then utilize that information for data transmission. In some examples, the user may issue a voice command 1212 to store some vocalized information as "note one." The user can then issue a voice command to "send note one to my work email," causing platform 1208 to generate an email to the user's work email address, with the contents of the message body being the contents of "note one." Similarly, an authenticated user may utilize the user interface provided by the voice code to populate user-defined data fields, i.e., "John Doe's Christmas List."

In accordance with another embodiment, the user may store custom "overrides" in the user profile database 1204. For example, the user may issue the command, "when I say Jeff, enter Jeffrey." In some embodiments, after receiving confirmation that the platform 1208 has stored the personalization override, each future occurrence of the user requesting "Mike" can be replaced by the string "Michael."

Figure 13:
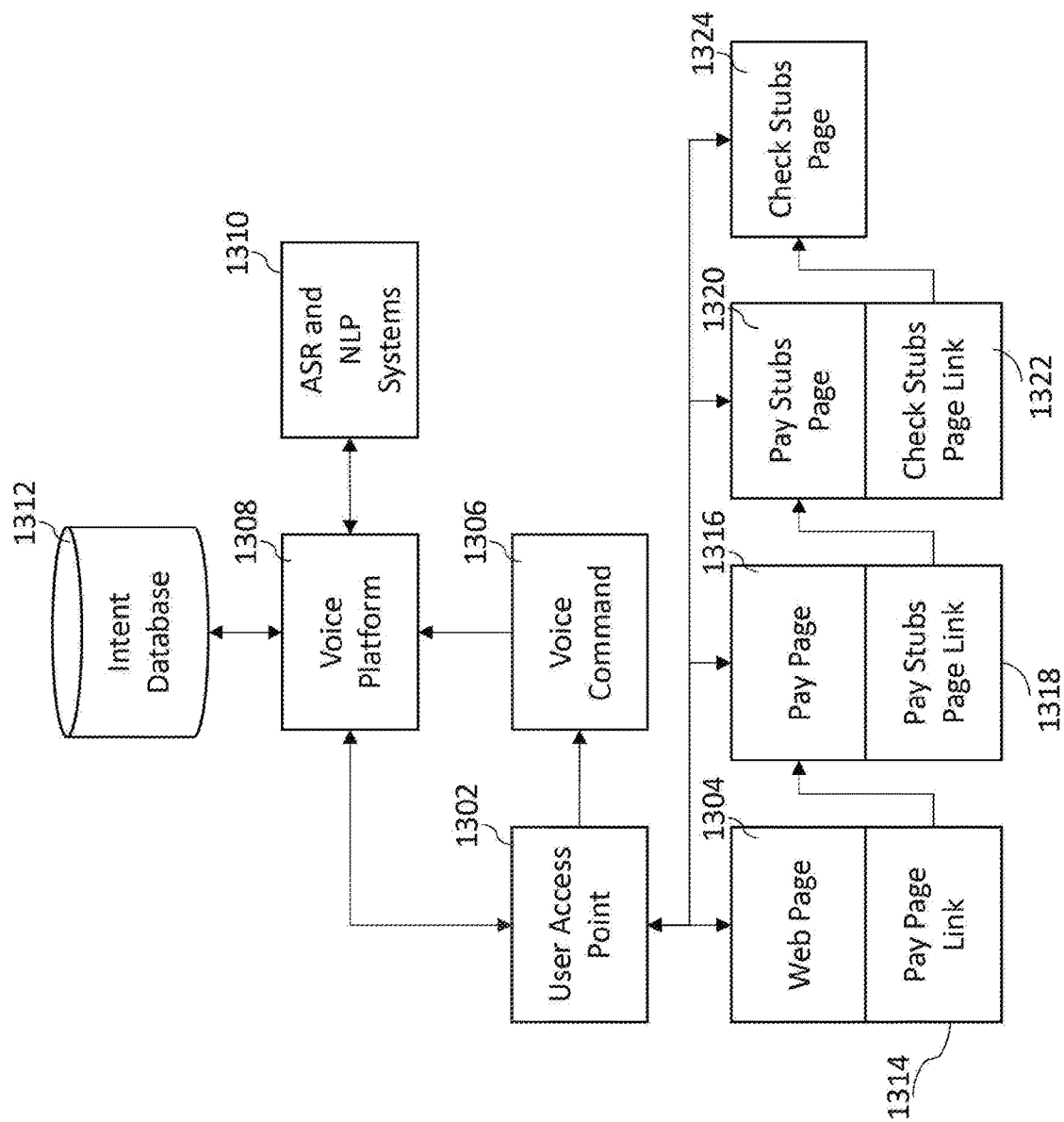
FIG. 13 is a schematic block diagram illustrating exemplary series commands in connection with voice-based interactions in accordance with various embodiments herein.

FIG. 13 is a schematic block diagram illustrating an example embodiment of a platform for handling "series commands," which may allow a user to issue a single contiguous voice command that may cause the system to execute multiple interactions on behalf of the user. The interactions may emulate the exact actions that a user would take (e.g., moving the cursor, clicking a link, etc.), or they can execute functions directly, depending upon various factors.

FIG. 13 illustrates an example in which a user wishes to view her latest pay stub via a website that includes a long series of pages leading to the desired information. That is, a user(s), through a user access point 1302, can begin their interaction on a web page 1304, speaking a voice command 1306 such as "view my latest pay stub." Voice platform 1308 (optionally including a voice module) may receive voice command 1306 and convert it to an intent using a combination of one or more ASR and NLP systems 1310. The intent or text (represented using any convenient data structure) can be returned to voice system 1308, which can retrieve (e.g., from intent database 1312) the steps necessary to execute the intent.

In some embodiments, the steps can be formatted as JavaScript code, structured data (e.g., JSON data), or any other such code that can represent the required steps. The program code can be delivered back to user access point 1302 (i.e., the user's browser) for execution.

In some embodiments, the intent can engage the "pay page" link 1314 on page 1304. The code can execute a click event on the link 1314 and the user's browser can navigate to the "pay page" 1316. In some embodiments, the voice code can determine that it is currently engaged in a series command, and can identify that the next step in the process may be to find and click the pay stubs link 1318 to reach the pay stubs page 1320. The check stubs link 1322 can then programmatically clicked, and the browser can navigate to the check stubs page 1324. In some embodiments, the system may identify the current state of the series command execution and iterate engaging one or more links 1314, 1318, and 1322 to display the latest check stub 1324.

In accordance with various embodiments, a modified version of the process described above in connection with FIG. 13 can be employed to provide a guided tutorial. That is, rather than automatically executing the series of commands by programmatically (or through emulation) clicking the correct series of links or otherwise executing the steps of the intent across multiple pages or within multiple views within a Single Page Application (SPA), the user can be provided with a visual indicator or other assistive technology to indicate which links should be clicked and in which order. In some embodiments, once the user has navigated (manually) to the target page (e.g. check stubs page 1324), the series command may be complete and execution may end.

Figure 14:
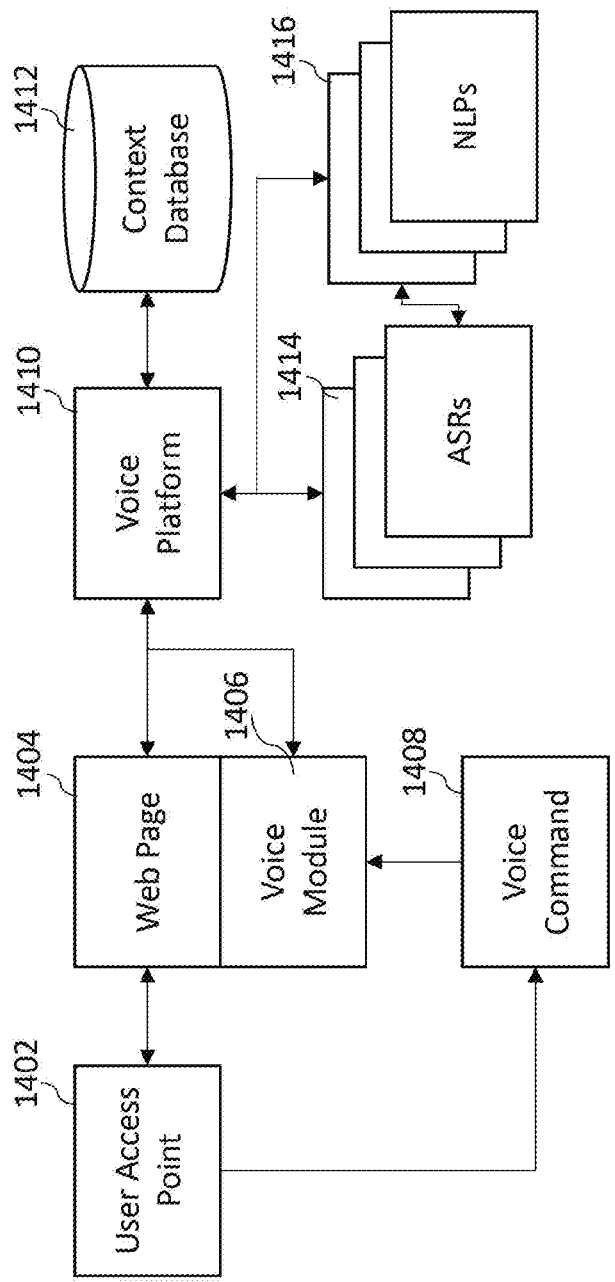
FIG. 14 is a schematic flow diagram illustrating an exemplary system for dynamically routing voice commands to an appropriate natural language processing (NLP) and/or automatic speech recognition (ASR) system in accordance with various embodiments herein.

FIG. 14 is a schematic flow diagram illustrating a system for dynamically routing voice commands to an appropriate, optimal, best-fit, or otherwise desirable natural language processing (NLP) and/or automatic speech recognition (ASR) system in accordance with various embodiments.

In some embodiments, when converting spoken voice input into intents, each available ASR and NLP engine may be more suited to particular contexts and applications and less suited to others. For example, there are ASR systems that excel at understanding proper nouns, while there are others that are better suited for dictionary terms. Likewise, there are NLP engines with high levels of accuracy with respect to understanding spoken food items, while others are better at understanding mathematical terminology.

In some embodiments, when a spoken utterance is received by the voice system, it may be the case that contextual clues can provide enough information to route the utterance to an appropriate combination of ASR and/or NLP engines. In other embodiments, no contextual clues may be apparent as to what type of information is being spoken by the user. In such embodiments, a sequential processing workflow may be required in which the audio is fed first into one processor, then into another, with the results being compared to determine next steps.

For example, a user may issue the command, "I need to take off the next three days for vacation" in conjunction with a web page form that accepts start date, end date, and pay code for submitting time-off requests. In the event NLP rules can be created to handle this functionality, the voice system might route the audio first to the configured ASR, and then send the returned copy through a selected NLP engine. In some embodiments, some NLP engines contain ASR functionality, so the illustrated workflow may provide the ability to make decisions as to the appropriate NLP and ASR engines for a given scenario. In some embodiments, once the NLP engine has returned the appropriate intent and variables (e.g. converting next three days to the current date, and the date three days from now), the code may execute on the page to make the appropriate selections on the form.

Referring to FIG. 14, the task of dynamically routing voice commands may take place as follows. In some embodiments, a user, through a user access point 1402, may access web page 1404, which may include a voice module 1406. The user may issue a voice command 1408 to voice platform 1410 via voice module 1406, which may utilize information contained on web page 1404 or from a context database 1412 to determine context and an appropriate routing path.

In some embodiments, voice platform 1410 may be communicatively coupled to a plurality of ASRs 1414, and a plurality of NLPs 1416. In some embodiments, a route can be configured and retrieved from a database 1412, which can instruct the voice platform 1410 to send the command first to one or more ASRs of the plurality of ASRs 1414, and can send that output to one or more NLPs of the plurality of NLPs 1416 for intent processing. The results from one or more NLPs of the plurality of NLPs 1416 can be sent back to voice platform 1410 for processing. The voice platform 1410 can send the appropriate program code back to voice module 1406, where it can be executed and the intended action can be performed.

In cases where no pre-defined logic or path exists, the voice platform 1410 may be configured to first send the audio to one or more NLPs of the plurality of NLPs 1416, and if no fully formed user action is detected, send the same command to one or more different NLPs of the plurality of NLPs 1416. If no fully formed user action is detected, the system may be configured to default to internal rules for subsequent or final action determination. In some embodiments, the system receives commands that are not properly married to an intent, and in such cases the system dynamically pairs the command to an intent, or a system administrator, through, e.g., a GUI, maps the command to an intent. In some embodiments, when the same command is detected again, the intent and associated programmatic steps can be carried out.

In accordance with some embodiments, the user may be required to fill in any logical gaps, i.e., by engaging in an interactive dialog with voice platform 1410. For example, if a user issues the command "scroll," the system may prompt the user (visually or via an audio or text prompt) for a particular direction (e.g., "up", "down", etc.). In some embodiments, logical gaps are not limited to single data points. For example, if the requested action is to process a time-off form, and the required data points are start date, end date, and pay code, a user issuing the time off command, providing only the pay code, may be promoted to respond with both the start date and end date.

Figure 15:
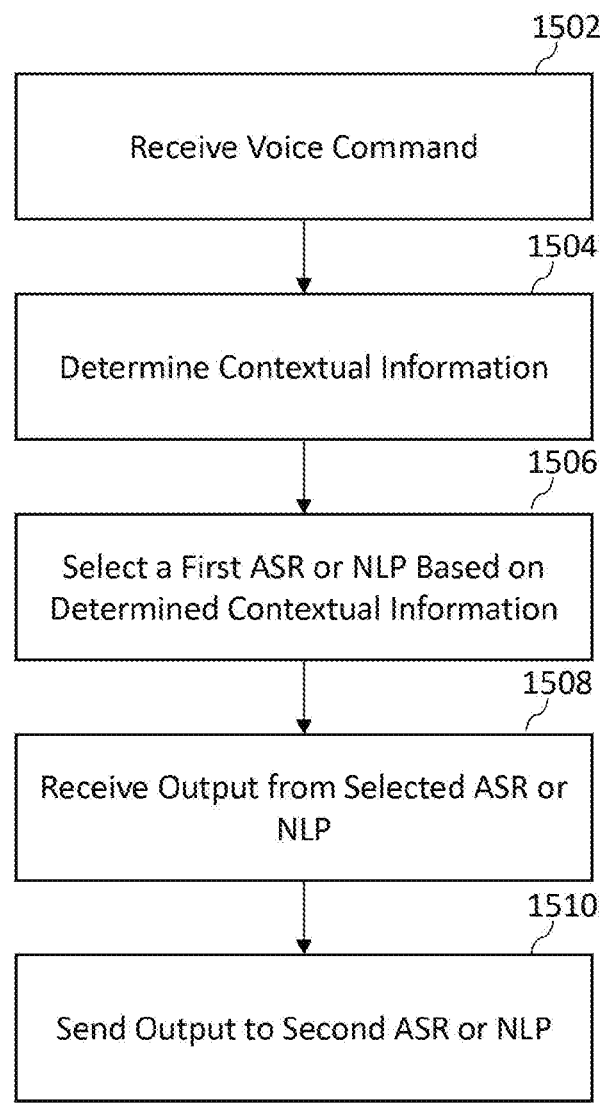
FIG. 15 is a flowchart illustrating an exemplary method for dynamically routing voice commands in accordance with various embodiments herein.

FIG. 15 is a flowchart illustrating an exemplary method for dynamically routing voice commands in accordance with various embodiments. In some embodiments, the method may include receiving a voice command (1502). In some embodiments, at 1504, the system may determine contextual information (e.g., from the current website, a database, etc.). Based on the contextual information, the system may select a recognition path including a first ASR or NLP to send the voice command (e.g., an audio representation of the voice command) to the selected ASR or NLP (1506). At 1508, the system may receive the output from the selected ASR or NLP and, based on that output, may alter the recognition path to send the output (and/or the original voice command) to a second ASR or NLP (1510).

Figure 16:
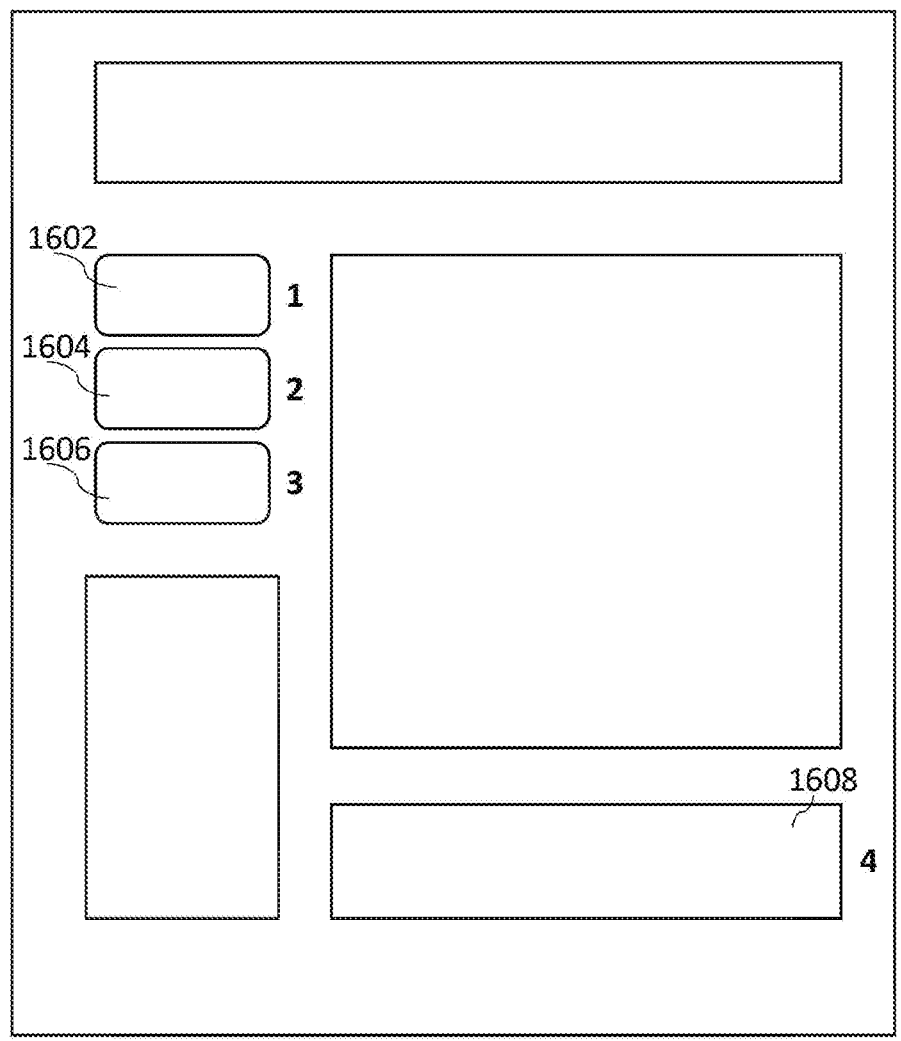
FIG. 16 illustrates an exemplary user interface including numerically labeled elements in accordance with various embodiments herein.

FIG. 16 illustrates an exemplary user interface including numerically labeled elements in accordance with various embodiment. More particularly, referring now to FIG. 16, an exemplary web page 1600 (which might correspond to any of the user interfaces described herein) may include a plurality of interactive elements 1602, 1604, 1606, and 1608. Such interactive elements might include, for example, hyperlinks, buttons, drop-down menus, radio buttons, or any other user interface element. As shown in FIG. 16, each of the interactive elements 1602, 1604, 1606, and 1608 can be accompanied by a corresponding, unique numeral code, alphabetical code, alphanumerical code, shape, and/or any other representative code (in this example, the numerals 1-4, respectively) that is displayed, for example, via the AE JavaScript. The numerals or any other representative code may be any convenient size, font, etc., and may be positioned above, to the side, or otherwise adjacent to their respective interactive elements. In accordance with various embodiments, the system may receive a voice command from the user corresponding to one of the displayed numerals or any other representative code, and can activate the corresponding interact element (e.g., by programmatically clicking the selected element). In some embodiments, for example, the user may say "go to three" or simply "three," prompting the system to activate button 1606.

Figure 17:
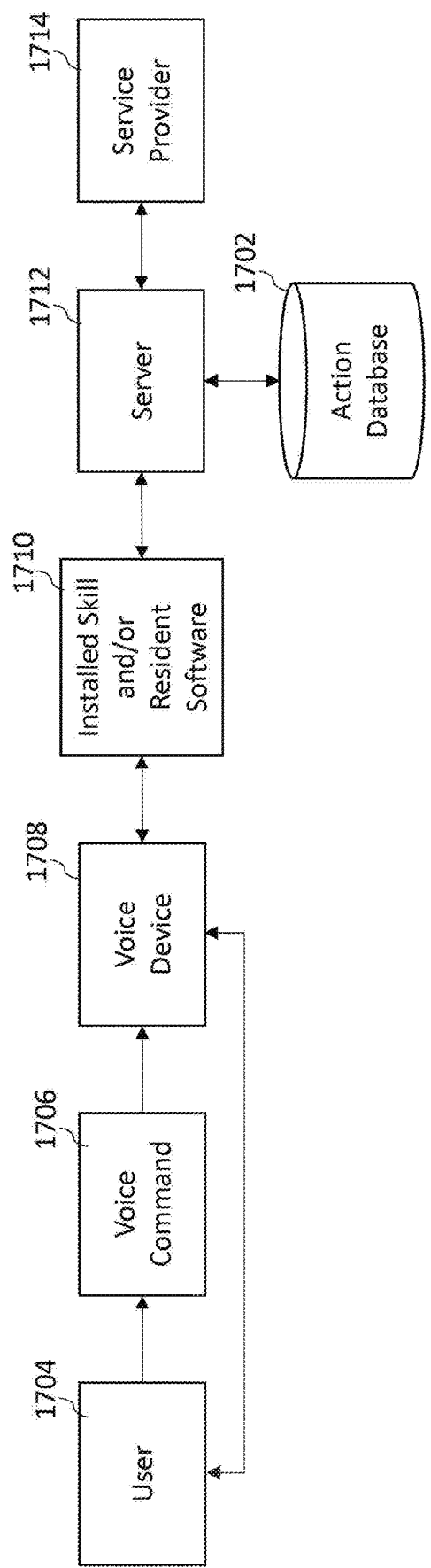
FIG. 17 is a schematic flow diagram illustrating an exemplary system for employing a middle tier in connection with a voice device in accordance with various embodiments herein.

FIG. 17 is a schematic flow diagram illustrating the use of a middle tier in connection with a voice device (e.g., Google Home, Amazon Echo, etc.) in accordance with various embodiments. In some embodiments, it can be assumed that an action database 1702 has been previously populated with information associated with the performance of a requested action, the requested action being associated with a particular service provider (e.g., a shopping site, a restaurant providing online ordering, or the like). Such information may include a favorite set of items or other preferences that the user had previously provided in connection with accessing that service provider's website.

With continued reference to FIG. 17, user 1704 may issue a voice command 1706 that can be processed by a voice device 1708. In some embodiments, voice device 1706 may utilize an installed skill or other resident software code 1710 when it sends the request to a server 1712 (e.g. a server that is used to provide the AE JavaScript). Server 1712 may retrieve relevant information from action database 1702 to perform the requested action via service provider 1714.

Figure 18:
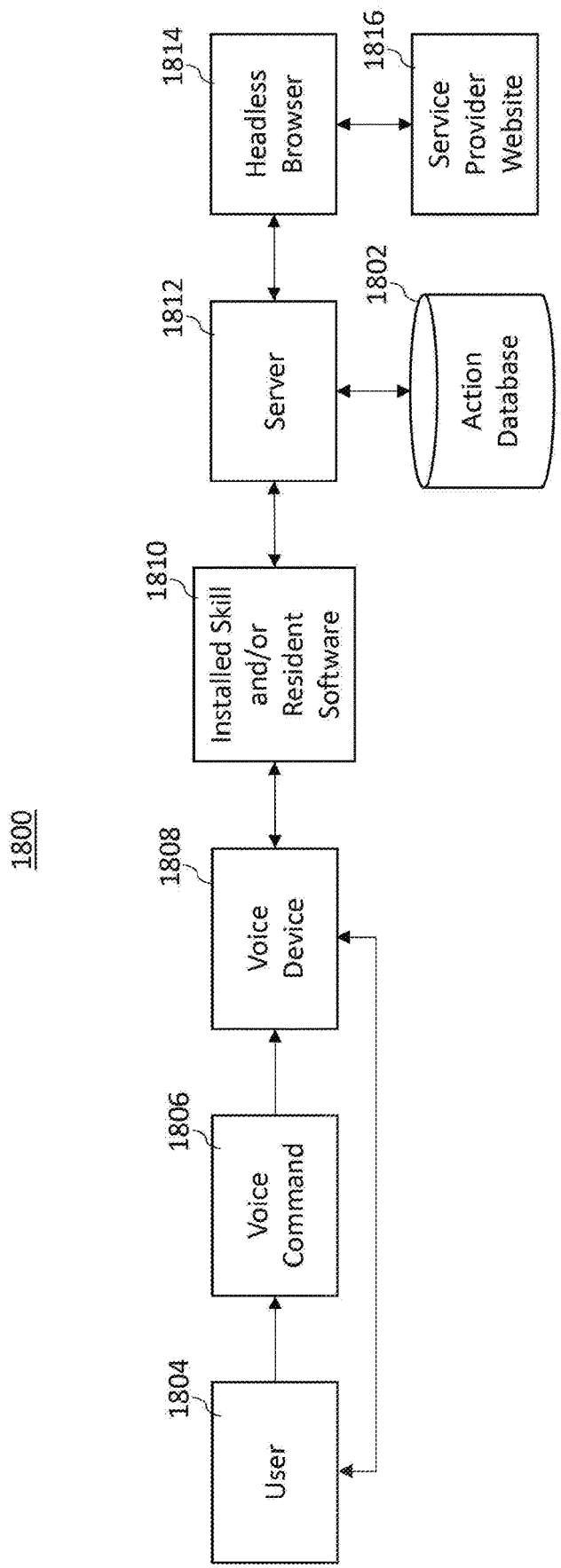
FIG. 18 is a schematic flow diagram illustrating an exemplary system for employing a middle tier in connection with a voice device in accordance with various embodiments herein.

FIG. 18 is a schematic flow diagram illustrating an example embodiment of a system 1800 for employing a middle tier in connection with a voice device such as that shown in FIG. 17. In some embodiments, no APIs are available from a service provider for performing actions outside of a normal web or app interaction. In these cases, skill 1810 may act as the middle-tier to execute requests on the user's behalf. Specifically, skill 1810 may send a request to server 1812 and server 1812 may retrieve user information from database 1802. Server 1802 may use a headless browser 1814 to log into service provider website 1816, and may perform the action requested by the voice skill.

Figure 19:
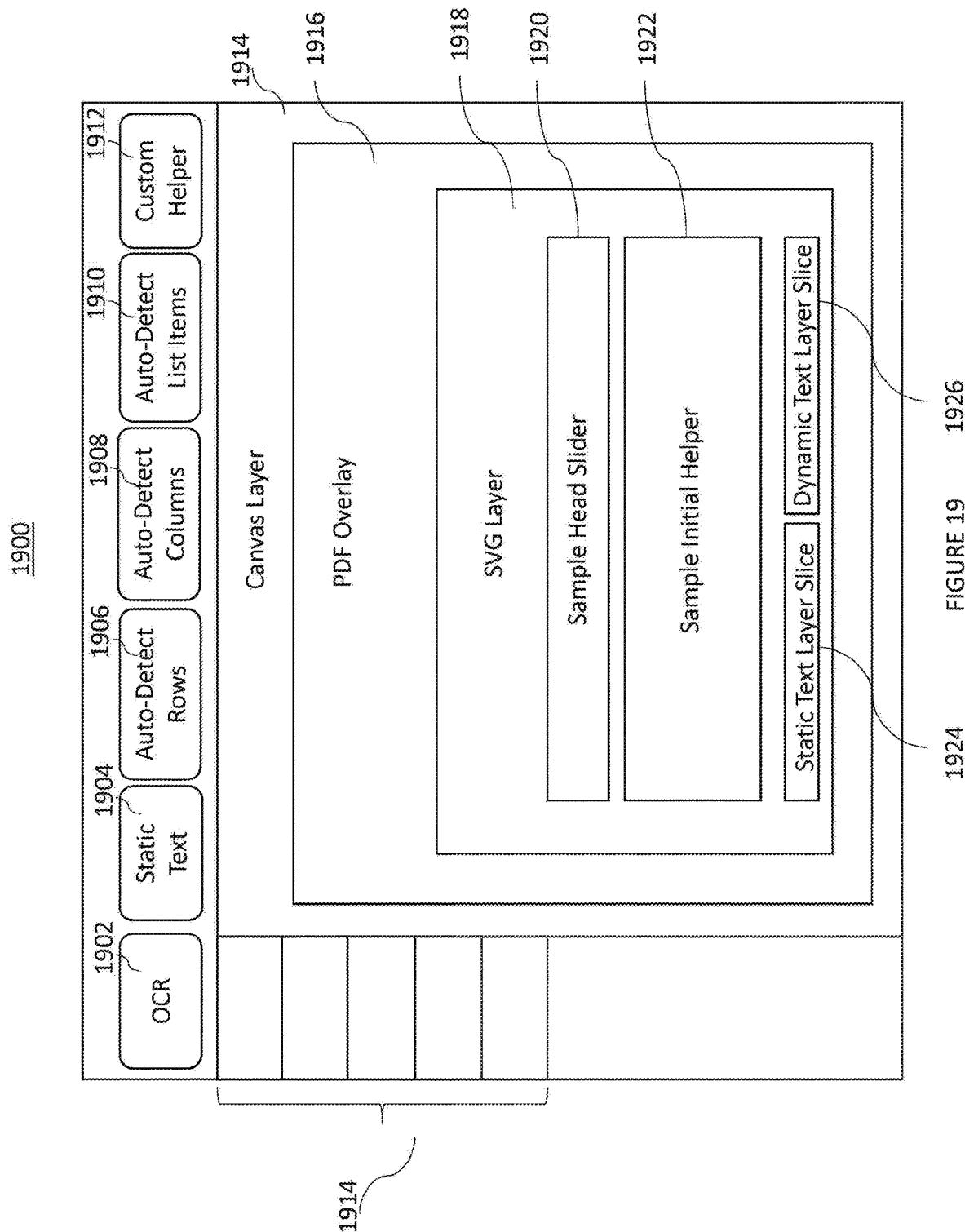
FIG. 19 is an exemplary web page illustrating the use of an exemplary portable document format generation tool in accordance with various embodiments herein.

FIG. 19 is an exemplary web page illustrating the use of a portable document format generation tool in accordance with various embodiments. In this regard, the term "PDF" for "portable document format" will be used herein without loss of generality. The methods described herein may be used in connection with other such formats (e.g., XPS).

In some embodiments, the accessibility of PDF documents may be increased by adding accessibility tags to the document (i.e., "tagging"). In accordance with various embodiments, however, users and admins are able to create HTML versions of PDF documents while also being able to export tagged PDF files those having the appropriate reader software.

Referring to FIG. 19, a web page 1900 may comprise a variety of components that allow a user (or admin) to create an alternate (e.g. HTML) version of a PDF document, as illustrated conceptually in the figure. Specifically, web page 1900 may comprise a series of buttons which might include, for example, an accordion menu 1914 that may provide an index or table of contents for the other elements appearing on webpage 1900. In some embodiments, shown along the top of web page 1900 may be a set of buttons or other user interface elements 1902, 1904, 1906, 1908, 1910, and 1912 that facilitate the creation of, for example, the HTML document. For example, user interface elements may be associated with performing optical character recognition (OCR) on a portion of the page (1902), adding a static text element (1904), adding auto-detect rows (1906), adding auto-detect columns (1908), adding auto-detect list items (1910), and adding a custom helper (1912).

In accordance with some embodiments, the web page 1900 may also include, for example, a canvas layer 1914, a PDF overlay 1916, an SVG layer 1918, a sample header slide 1920, a sample initial helper 1922, a static text layer slice 1924, and a dynamic text layer slice 1926. In some embodiments, using the available controls, the user may identify (within the displayed PDF document) each content area of a document (e.g., using a rectangular selection tool), and may associate the content block with the most appropriate accessibility tag. For example, a title displayed at the top of the first page of the PDF document might be selected and marked as the highest level heading (h1).

In accordance with various embodiments, processing may proceed in the following manner. In some embodiments, the system can create an HTML5 canvas layer (1914) having the PDF content (1916) rendered within it. The system may extract, when possible, blocks of content from the rendered PDF that can be programmatically identified as being of a certain content type, and may automatically generate "initial helpers" for these elements. For example, the system may recognize that there are bullets on the page that are aligned vertically, therefore assuming this content to be an unordered list. In some embodiments, the system could generate an initial helper whose slice would encompass the entire list, with the helper type being set to "list" or similar (e.g., 1922). Initial helpers can be sorted by top and left x/y coordinates to place them in a default order. These x/y coordinates may be automatically or manually determined. The user can extract, when possible, blocks of text from the rendered PDF content, and these blocks can generate entries in accordion (1914) in the same way that entries are generated during the "initial helper" process described above. In some embodiments, some or all elements can be appended to a parent page element and an SVG element (1918) may be added on top of the canvas layer to allow rectangles to be drawn, thereby defining which texts blocks should be considered an individual entity.

In some embodiments, when a slice (e.g., 1920, 1922, 1924, and 1926) is drawn (either manually or autonomously) on the SVG layer 1918, the PDF accessibility tool can retrieve any text from the underlying text-layer elements within the rectangular coordinates. If no text is detected, the system may attempt to perform an OCR of the area inside the coordinates using one or more computer vision APIs. The helpers can be added, for example, to an accordion display (1914) within a form that allows the user to set element types, replace text, and/or change other attributes as appropriate. The element types might include, for example, basic HTML elements such as paragraphs, headers, unordered lists, and tables, as those types map roughly to both HTML elements as well as document accessibility tags.

In some embodiments, if difficulties are experienced detecting a particular portion of text, the user may engage the OCR function (1902) to extract some or all text from the current page. The result of the OCR process can be merged with the initial text in order to provide more accurate text data.

In some embodiments, some or all work performed by the user in creating the HTML version of the PDF document can be stored as a separate version, with changes only being visible to end-users after promotion of the document to production level.

In some embodiments, with respect to displaying the PDF content on a website, the client can create a blank page on their website that substantially includes only the AE Javascript. On pages that contain links to PDF files that have been remediated, the user may be given the choice to download the original PDF or view the accessible version. Selecting the accessible version may link them to the blank page, passing in the URL of the PDF. On this page, a pdf-reader and player code may load. The code may detect the rendering of the text layer and retrieve the elements in order to manipulate them. The elements can be sorted by left and top edges with an adjustment based, for example, on heuristic rules (e.g., to account for bolded text in the middle of a sentence, or the like). The array of sorted elements can be used to create an array of text lines.

In some embodiments, if helpers as described above exist on the page, the system may loop through them and add them to the array of lines at the appropriate place (based, for example, on their top position). Using the helper item type the system may create the elements to which the HTML is to be applied. The system may attempt to ensure the appropriate data attributes are added to the elements in order to create the tagged PDF documents.

In some embodiments, the initial text layer may be replaced with the new, structured HTML content. In some embodiments, as the pages are loaded, the system can store the HTML in an array together with a data URI containing a representation of the canvas image. In some embodiments, when the download button is clicked, the array can be looped through to retrieve the HTML and the URIs for each page and apply it to a template HTML file with the image from the canvas absolutely positioned over the text layer for each page. The HTML can be sent to a PDF server to generate a downloadable PDF.

In some embodiments, the PDF server may receive the provided HTML and load it with, for example, a customized version of DOMPDF (an HTML to PDF converter that takes HTML and CSS and converts it to a PDF). The modification might include, for example, applying data attributes from the HTML and translating them into attributes that may be required for a tagged PDF. In some embodiments, the modifications comprise, for example, reading the height and width of the text layer in order to change the paper size and layout dynamically when rendering the PDF. The completed document can be transmitted to the browser where it can be downloaded.

The auto-detect columns button 1908 may initiate a process that comprises obtaining the coordinates of the containing table and creating an array with the elements within that area. These elements can be sorted by their left position and added to an array of columns created based on, for example, the elements' right and left coordinates. If an element is partially within the boundaries of a column, the system may add the element to a column and the column coordinates can be updated accordingly. Similarly, the auto-detect rows button 1906 may initiate a process comprising obtaining the coordinates of the containing table and creating an array with some or all elements within that area. The elements can then be added to an array of rows created based on, for example, the element's top and bottom coordinates.

In some embodiments, the autodetect list items button 1910 may initiate a process comprising obtaining the coordinates of the containing list and create an array with all the text layer elements within that area. Bullets may also be detected based on, for example, the first character of each row and whether the left position of that letter is less than 10 px from the left position of the parent list.

Figure 20:
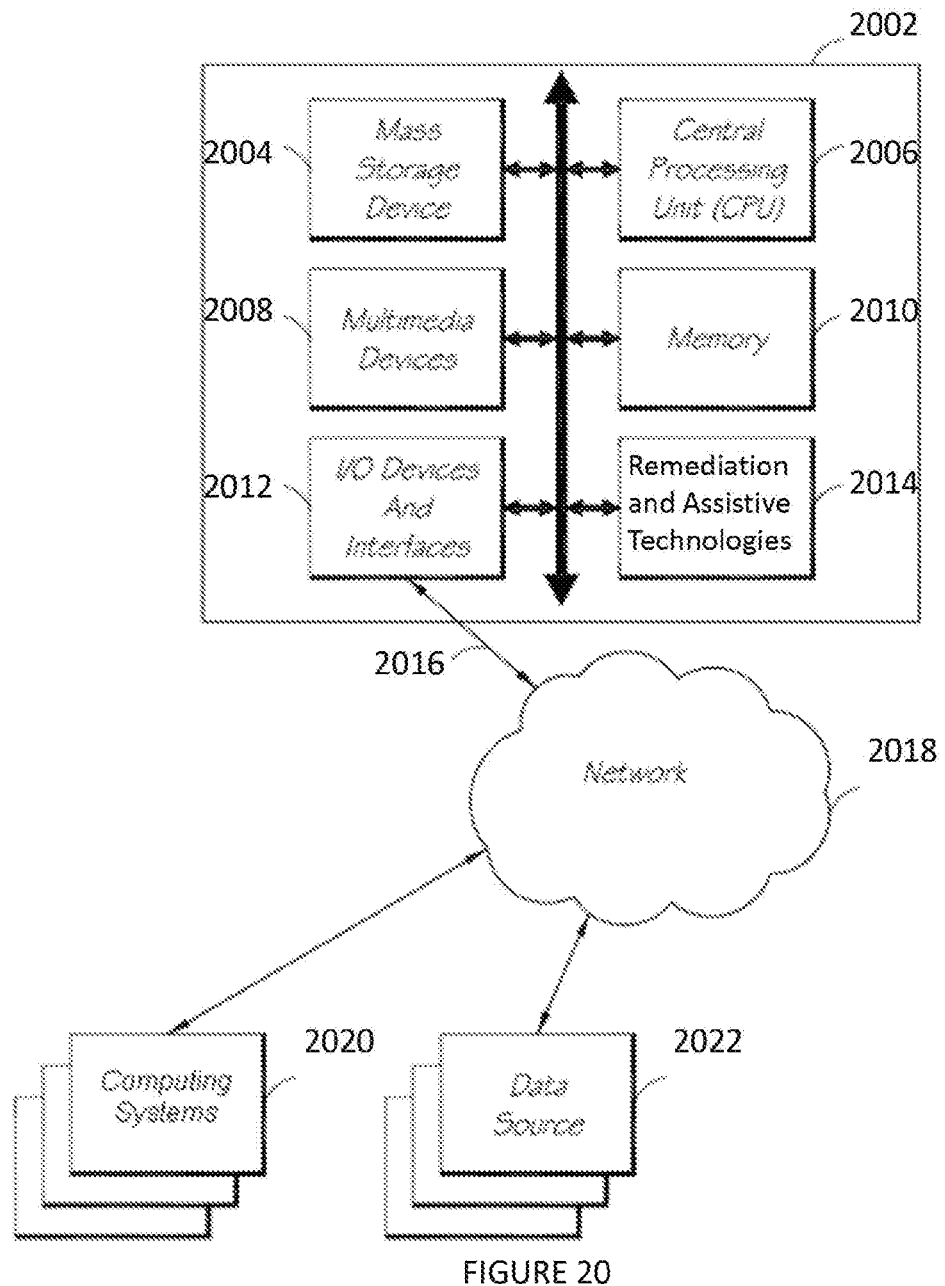
FIG. 20 is a block diagram depicting an example embodiment of a computer system configured to run software for implementing one or more embodiments of the website remediation and assistive technologies systems, methods, and devices disclosed herein.

FIG. 20 is a block diagram depicting an embodiment of a computer hardware system configured to run software for implementing one or more embodiments of the website remediation and assistive technologies systems, methods, and devices disclosed herein.

In some embodiments, the systems, processes, and methods described herein are implemented using a computing system, such as the one illustrated in FIG. 20. The example computer system 2002 is in communication with one or more computing systems 2020 and/or one or more data sources 2022 via one or more networks 2018. While FIG. 20 illustrates an embodiment of a computing system 2002, it is recognized that the functionality provided for in the components and modules of computer system 2002 may be combined into fewer components and modules, or further separated into additional components and modules.

The computer system 2002 can comprise a remediation and assistive technologies module 2014 that carries out the functions, methods, acts, and/or processes described herein. The remediation and assistive technologies module 2014 is executed on the computer system 2002 by a central processing unit 2006 discussed further below.

In general, the word "module," as used herein, refers to logic embodied in hardware or firmware or to a collection of software instructions, having entry and exit points. Modules are written in a program language, such as JAVA, C or C++, PYPHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 2002 includes one or more processing units (CPU) 2006, which may comprise a microprocessor. The computer system 2002 further includes a physical memory 2010, such as random access memory (RAM) for temporary storage of information, a read only memory (ROM) for permanent storage of information, and a mass storage device 2004, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 2002 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 2002 includes one or more input/output (I/O) devices and interfaces 2012, such as a keyboard, mouse, touch pad, and printer. The I/O devices and interfaces 2012 can include one or more display devices, such as a monitor, that allows the visual presentation of data to a user. More particularly, a display device provides for the presentation of GUIs as application software data, and multi-media presentations, for example. The I/O devices and interfaces 2012 can also provide a communications interface to various external devices. The computer system 2002 may comprise one or more multi-media devices 2008, such as speakers, video cards, graphics accelerators, and microphones, for example.

The computer system 2002 may run on a variety of computing devices, such as a server, a Windows server, a Structure Query Language server, a Unix Server, a personal computer, a laptop computer, and so forth. In other embodiments, the computer system 2002 may run on a cluster computer system, a mainframe computer system and/or other computing system suitable for controlling and/or communicating with large databases, performing high volume transaction processing, and generating reports from large databases. The computing system 2002 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 2002 illustrated in FIG. 20 is coupled to a network 2018, such as a LAN, WAN, or the Internet via a communication link 2016 (wired, wireless, or a combination thereof). Network 2018 communicates with various computing devices and/or other electronic devices. Network 2018 is communicating with one or more computing systems 2020 and one or more data sources 2022. The remediation and assistive technologies module 2014 may access or may be accessed by computing systems 2020 and/or data sources 2022 through a web-enabled user access point. Connections may be a direct physical connection, a virtual connection, and other connection type. The web-enabled user access point may comprise a browser module that uses text, graphics, audio, video, and other media to present data and to allow interaction with data via the network 2018.

Access to the remediation and assistive technologies module 2014 of the computer system 2002 by computing systems 2020 and/or by data sources 2022 may be through a web-enabled user access point such as the computing systems' 2020 or data source's 2022 personal computer, cellular phone, smartphone, laptop, tablet computer, e-reader device, audio player, or other device capable of connecting to the network 2018. Such a device may have a browser module that is implemented as a module that uses text, graphics, audio, video, and other media to present data and to allow interaction with data via the network 2018.

The output module may be implemented as a combination of an all-points addressable display such as a cathode ray tube (CRT), a liquid crystal display (LCD), a plasma display, or other types and/or combinations of displays. The output module may be implemented to communicate with input devices 2012 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 2002 may comprise a physical or logical connection established between a remote microprocessor and a mainframe host computer for the express purpose of uploading, downloading, or viewing interactive data and databases on-line in real time. The remote microprocessor may be operated by an entity operating the computer system 2002, including the client server systems or the main server system, an/or may be operated by one or more of the data sources 2022 and/or one or more of the computing systems 2020. In some embodiments, terminal emulation software may be used on the microprocessor for participating in the micro-mainframe link.

In some embodiments, computing systems 2020 who are internal to an entity operating the computer system 2002 may access the remediation and assistive technologies module 2014 internally as an application or process run by the CPU 2006.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 2002 may include one or more internal and/or external data sources (for example, data sources 2022). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 2002 may also access one or more databases 2022. The databases 2022 may be stored in a database or data repository. The computer system 2002 may access the one or more databases 2022 through a network 2018 or may directly access the database or data repository through I/O devices and interfaces 2012. The data repository storing the one or more databases 2022 may reside within the computer system 2002.

Figure 21:
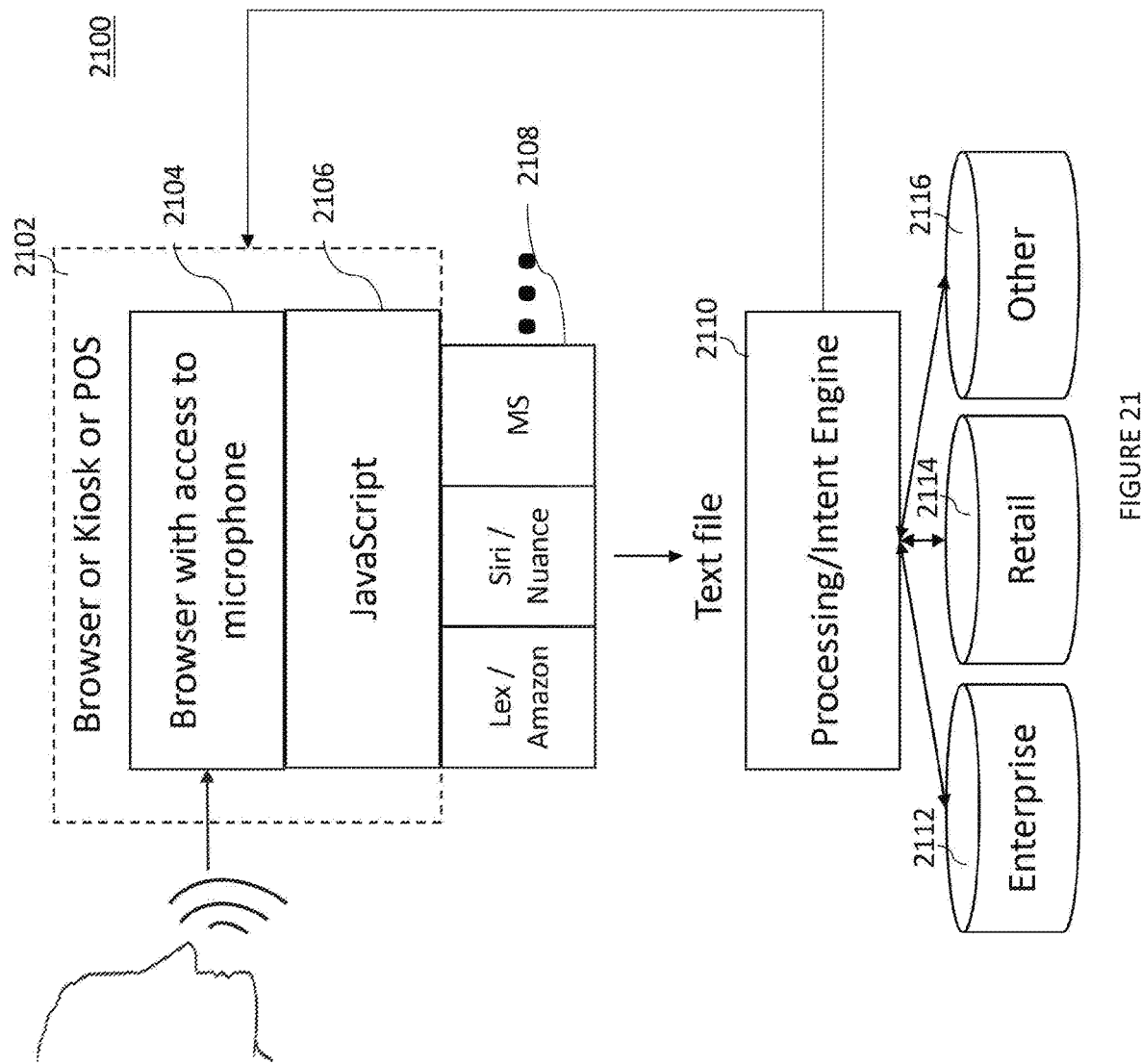
FIG. 21 a flowchart illustrating an exemplary system for a voice-enabled kiosk or point-of-sale user interface in accordance with various embodiments herein.

FIG. 21 a flowchart illustrating an exemplary system for a voice-enabled kiosk, browser, or point-of-sale user interface in accordance with various embodiments herein. In some embodiments, voice-enabled systems as described herein can be wholly compatible with compliant web sites, web applications, operating systems, user interfaces, browser, and others through a browser-based controller interface, a secondary device, or other microphone-enabled source. In some embodiments, the remediation systems, devices, and methods described herein can be used to fix compliance issues with web sites or user interfaces, such that the web sites or user interfaces may be voice-enabled. In some embodiments, the system allows full control of the actual functionality and visual presentation of a browser, website, user interface, or application through voice command. In some embodiments, common browser functions (e.g. go back, reload, scroll, open settings, go to <insert link name here>, move to <insert form input name here>, enter <insert form input>) can be activated upon voice command. Additionally, users can create customized, application-specific or generalized voice commands according to their preferences to perform specific dynamic actions. In some embodiments, the system can act as a voice-controlled hub that directs a user to various other applications. In some embodiments, the system is fully integrated into those various applications to provide a complete and seamless voice-enabled user experience.

Referring to FIG. 21., the system 2100 may comprise a browser, kiosk, or other point-of-sale user interface 2102. In some embodiments, the browser, kiosk, or other point-of-sale user interface 2102 may comprise a microphone 2104 and an integrated JavaScript 2106 for performing voice command execution. In some embodiments, the web browser, kiosk, or other point-of-sale 2102 user interface may comprise a "click-to-listen" button or it may be configured to detect voice commands automatically through an always listening paradigm. In some embodiments, the end-user may click a button to prompt the "listening" function. In some embodiments, engagement may be triggered through an always listening paradigm, whereby actions are triggered by speaking a trigger command, which is fully configurable on a fully custom basis (e.g. "Computer" or <insert company name>). In other embodiments, a voice command can be spoken to a secondary device such as a cellular phone or tablet, which can be paired with the browser, kiosk, or other point-of-sale user interface 2102 to control the system remotely. The pairing process may be achieved through pairing options such as, for example, QR scanning, secure key-value pair authentication, multi-factor authentication, and secure link authentication.

In some embodiments, the system may be configured to dynamically route voice commands to an appropriate, optimal, best-fit, or otherwise desirable natural language processing (NLP) and/or automatic speech recognition (ASR) system 2108, as described in more detail above. In some embodiments, the system will comprise an NPL and/or ASR. Thus, the speech-to-text conversion and subsequent interpretation can occur within the system itself. In other embodiments, the system will transmit an audio file of the spoken voice command to a third-party NP and/or ASR for speech processing. In some embodiments, the system can utilize both an integrated NLP and/or ASR as well as third-party services.

In some embodiments, the output of the NLPs and/or ASRs is directed to an intent/processing engine 2110, which may interpret the intent of the command and pair the spoken command into an actionable command. In some embodiments, the actionable command may consist of a single command tied to a single action. Alternatively, intent may consist of a single or series of commands that execute multiple operations in series, as discussed in more detail herein. Thus, in some embodiments, the system may be configured to allow a user to speak a single command that triggers a series of clicks across multiple pages to, for example, find requested information or for filling out multiple fields in a web form. For example, the system could be configured to execute a "Check-out" routine, which could trigger a series of steps to facilitate the shopping cart purchase experience within a Single Page Application (SPA) or across a series of pages within a more traditional website experience. In some embodiments, the intent/processing engine 2110 may utilize one or more command databases (e.g. enterprise database 2112, retail database 2114, and other database 2116), containing contextual data that can contribution to converting the spoken voice command into an functional command.

In some embodiments, the system may comprise a custom function processor, which may interpret basic commands tied to common behaviors. This approach bypasses third-party NLP services and adds a level of speed and efficiency to the processing required in order to fulfill user intent.

In various embodiments described herein, the system may be intended to provide a voice-driven user experience that is paired with a visual presentation layer, i.e. the modern web browser presented from a computer display or, for example, a kiosk terminal.

EMBODIMENTS

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Further, while the systems, methods, and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

What is claimed is:

1. A system for automated creation and deployment of remediations to web pages or user interfaces, the system comprising:
    one or more remediation code databases configured to store a plurality of remediation code blocks;
    a JavaScript code database comprising one or more JavaScript codes for detecting non-compliant elements of web pages or user interfaces, the web pages or user interfaces comprising a hypertext markup language (HTML) document object model (DOM);
    one or more computer readable storage devices configured to store a plurality of computer executable instructions; and
    one or more hardware computer processors in communication with the one or more computer readable storage devices and configured to execute the plurality of computer executable instructions in order to cause the system to:
        store an inventory comprising a set of one or more web pages or user interfaces previously accessed by a browser;
        perform a first compliance assessment on the set of one or more web pages or user interfaces of the inventory, wherein performing the first compliance assessment comprises testing the set of one or more web pages or user interfaces of the inventory;

dynamically crawl a user-requested web page or user interface requested by a user device to generate a list of uniform resource locators (URLs) corresponding to one or more additional web pages or user interfaces, wherein the URLs are embedded in the user-requested web page or user interface;

perform a second compliance assessment, by a scanning process commenced before a rendering of the user-requested web page or user interface on the user device, on the user-requested web page or user interface and the one or more additional web pages or user interfaces to identify one or more compliance issues, wherein the second compliance assessment comprises loading each of the user-requested web page or user interface and the one or more additional web pages or user interfaces in a headless browser, applying at least one of the JavaScript codes and executing a series of compliance tests;

map the one or more identified compliance issues to one or more remediation scripts, wherein each of the one or more remediation scripts corresponds to a compliance issue;

access, from the one or more remediation code databases, one or more remediation code blocks comprising the one or more remediation scripts mapped to the one or more identified compliance issues; and apply the one or more remediation code blocks on the user-requested web page or user interface and the one or more additional web pages or user interfaces, wherein application of the one or more remediation code blocks manipulates the DOM corresponding to each of the user requested web page or user interface and the one or more additional web pages or user interfaces to correct the one or more identified compliance issues.

2. The system of claim 1, wherein the user-requested web page or user interface is crawled using a configuration file.

3. The system of claim 2, wherein the configuration file comprises a specified maximum crawl time and level of recursion, wherein the level of recursion defines a depth of web pages or user interfaces to be crawled.

4. The system of claim 2, wherein the configuration file comprises one or more configuration options, the configuration options comprising configuration of at least one of: a user agent, browser dimensions, starting page, inclusion of subdomains, inclusion of cookies, or usage of a defined site map.

5. The system of claim 1, wherein the series of compliance tests assess one or more testable success criteria as supported by Web Content Accessibility Guidelines (WCAG).

6. The system of claim 1, wherein the series of compliance tests are automatically or manually altered based on evolving web accessibility standards.

7. The system of claim 1, wherein the series of compliance tests determine whether or not one or more specific use-cases are accommodated within the DOM.

8. The system of claim 1, wherein the application of the one or more remediation code blocks is combined with one or more manual remediations to remove the one or more identified compliance issues.

9. The system of claim 1, wherein the one or more identified compliance issues comprise at least one of the following: language attribute not set, INPUT missing label, empty anchor, heading missing text, text alternatives missing from non-text content, unnecessary duplication of link description, skip-to link not present, and links do not warn user before opening a new window.

10. The system of claim 1, further comprising a real-time auto-detection and audio enablement (RADAE) engine configured to detect web page content and element types.

11. The system of claim 1, further comprising a machine learning engine configured to:
learn from the application of the one or more remediation code blocks-allowing it to create and suggest future programmatic applications; and
automatically modify the one or more remediation code blocks during the creation of the future programmatic applications.

12. The system of claim 11, wherein the machine learning engine learns using one or more of supervised, unsupervised, semi-supervised, or reinforcement learning paradigms.

13. The system of claim 1, wherein the one or more remediation code databases comprise one or more of dynamic link libraries (DLL) or JavaScript object notation (JSON) format databases.

14. The system of claim 1, wherein the system is further caused to:
determine a confidence rating for each of the one or more identified compliance issues;
automatically apply the one or more remediation code blocks to the one or more identified compliance issues without user approval if the confidence rating is determined to be greater than a predetermined threshold.

15. A system for form-based creation and deployment of remediations to one or more web pages or user interfaces, the system comprising:
one or more computer readable storage devices configured to store a plurality of computer executable instructions; and
one or more hardware computer processors in communication with the one or more computer readable storage devices and configured to execute the plurality of computer executable instructions in order to cause the system to:
cause display, through a dynamic user interface, a web-based form comprising visual elements of one or more web pages or user interfaces;
evaluate each of the one or more web pages or user interfaces to identify one or more compliance issues, wherein the evaluation comprises loading each of the one or more web pages or user interfaces in a headless browser, applying at least one JavaScript code, and executing a series of compliance tests;
receive, into the web-based form, an input corresponding to each identified one or more compliance issues, wherein the input is provided by a user;
submit the web-based form to a server infrastructure, wherein the submission of the web-based form causes programmatic generation of an accelerated remediation code for each of the identified one or more compliance issues by combining the input corresponding to each identified one or more compliance issues with at least one JavaScript remediation codes, and wherein each accelerated remediation code corresponding to an identical required remediation type is stored in a same remediation code database of one or more remediation code databases;

receive a request for the accelerated remediation code corresponding to each of the identified one or more compliance issues of at least one of the one or more web pages or user interfaces;

access, from the one or more remediation code databases, the accelerated remediation code corresponding to each of the identified one or more compliance issues of the at least one of the one or more web pages or user interfaces; and transmit the accelerated remediation code corresponding to each of the identified one or more compliance issues of the at least one of the one or more web pages or user interface.

16. The system of claim 15, further comprising a machine learning engine, the machine learning engine configured to:
compare the identified one or more compliance issues with one or more previously identified and resolved compliance issues; and
ascertain one or more previously executed remediation code blocks that may be applicable to the identified one or more compliance issues from the one or more remediation code databases; and
automatically modify the one or more previously executed remediation code blocks to address the identified one or more compliance issues.

17. The system of claim 15, wherein the machine learning engine learns using one or more of supervised, unsupervised, semi-supervised, or reinforcement learning paradigms.

18. The system of claim 15, wherein the one or more accelerated remediations can be applied to one or more of the following compliance issues: inadequate ALT-text, link images with missing or inadequate ALT-text, input images with missing or inadequate ALT-text, iFrames missing titles, disordered headers, heading level issues, inputs missing labels, or links missing labels.

19. A computer implemented method for identifying structural patterns across a plurality of web pages and determining a set of remediations that can be applied to the plurality of web pages, the method comprising:
identifying, by a computer system, within a first document object model (DOM) corresponding to a first web page of the plurality of web pages, a first hierarchical structure, wherein the first hierarchical structure comprises one or more hierarchies, and wherein each hierarchy of the first hierarchical structure comprises one or more first elements;
identifying, by the computer system, within a first URL corresponding to the first web page, a first URL structure, the first URL structure comprising a specific path structure;
evaluating, by the computer system, the first web page to identify one or more compliance issues, wherein the evaluation comprises loading the first web page in a headless browser, applying at least one JavaScript code, and executing a series of compliance tests;
determining, by the computer system, a first test result pattern, the first test result pattern comprising a first group of the one or more first elements of the first hierarchical structure that pass a first subset of the series of compliance tests and a second group of the one or more first elements of the first hierarchical structure that fail a second subset of the series of compliance tests;
generating, by the computer system, a template based at least in part on the identified first hierarchical structure, the identified first URL structure, and the identified first test result pattern, wherein the generated template comprises one or more remediations to resolve the one or more identified compliance issues of the first web page;
storing the generated template comprising the one or more remediations in a remediation database;
identifying, by the computer system, within a second document object model (DOM) corresponding to a second web page of the plurality of web pages, a second hierarchical structure, wherein the second hierarchical structure comprises one or more hierarchies, wherein each hierarchy of the second hierarchical structure comprises one or more second elements, and wherein the one or more second elements comprise commonalities to the one or more first elements of the first hierarchical structure in one or more of placement, class, or appearance, and wherein the second hierarchical structure comprises a substantially identical structural pattern to the first hierarchical structure;
identifying, within a second URL corresponding to the second web page, a second URL structure, the second URL structure comprising the specific path structure of the first URL structure;
evaluating, by the computer system, the second web page to identify one or more compliance issues, wherein the evaluation comprises loading the second web page in a headless browser, applying at least one JavaScript code, and executing the series of compliance tests;
determining, by the computer system, a second test result pattern, the second test result pattern comprising a first group of the one or more second elements of the second web page that pass the first subset of compliance tests and a second group of the one or more second elements of the second web page that fail the second subset of compliance tests, wherein the second test result pattern is substantially identical to the first test result pattern; and
applying, by the computer system, the generated template comprising the one or more remediations to the second web page,
wherein the computer system comprises a computer processor and an electronic non-transitory computer storage medium.

20. The computer-implemented method of claim 19, wherein the one or more identified compliance issues comprise: inadequate ALT-text, link images with missing or inadequate ALT-text, input images with missing or inadequate ALT-text, iFrames missing titles, disordered headers, heading level issues, inputs missing labels, or links missing labels.

* * * * *